United States Patent Office 3,387,061
Patented June 4, 1968

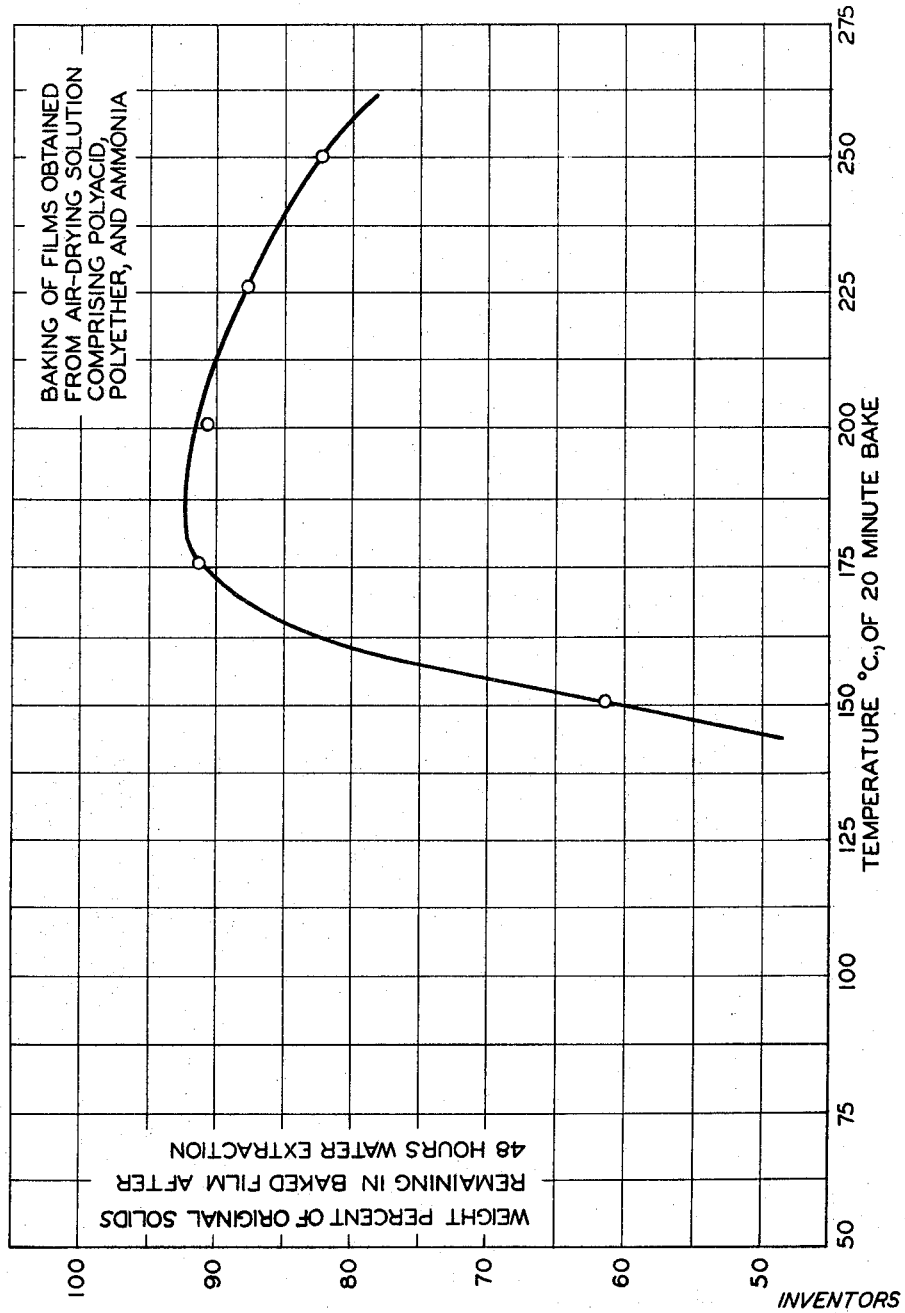

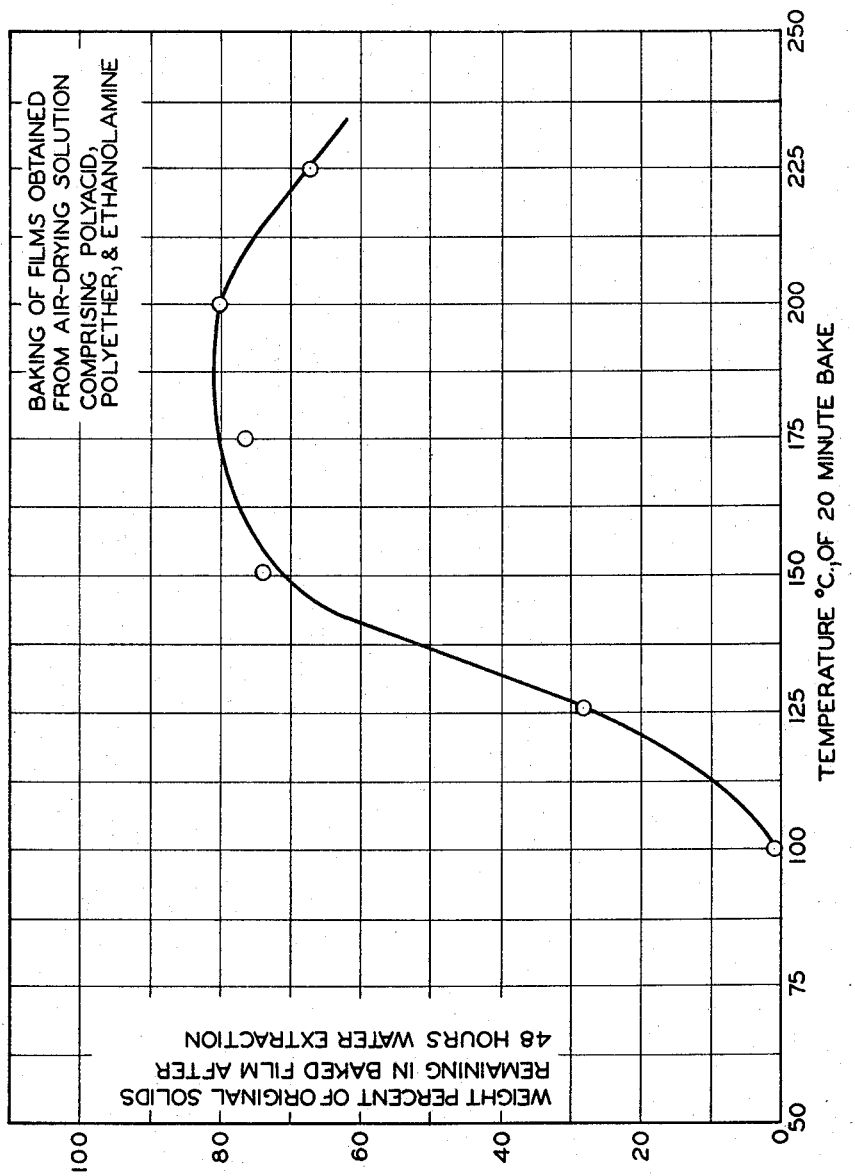

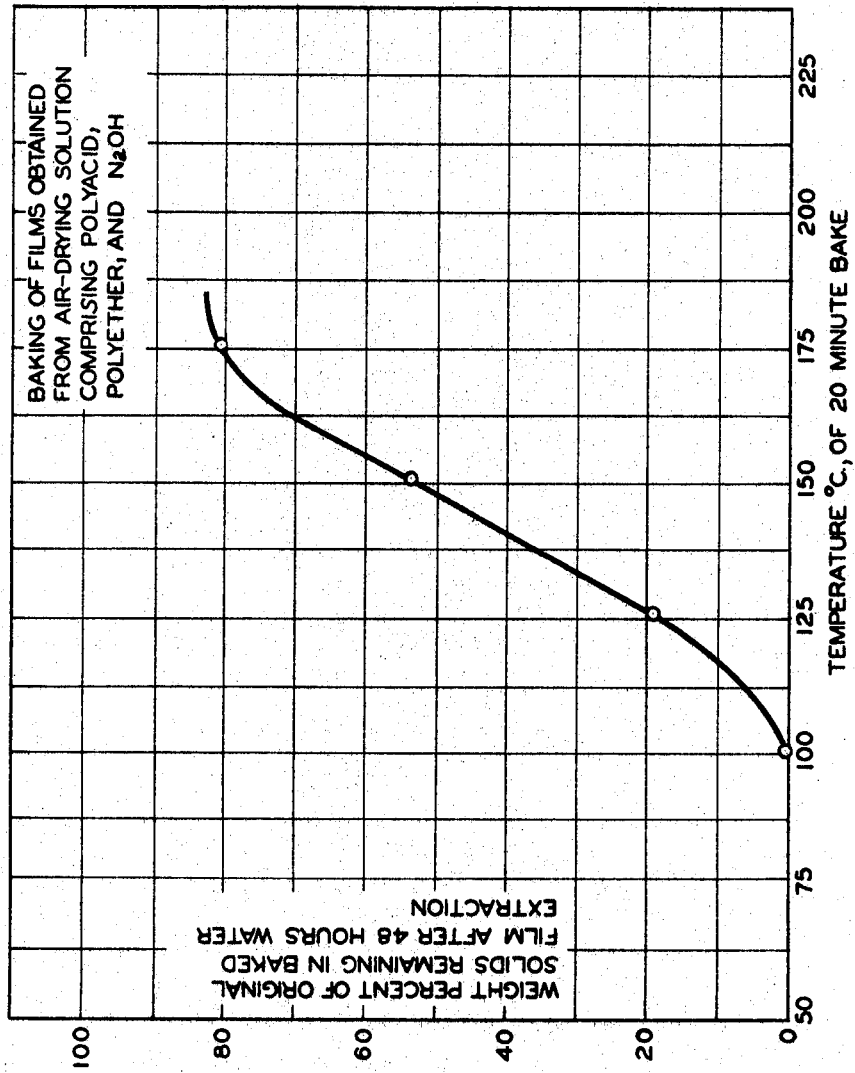

3,387,061
CHEMICAL REACTION PRODUCT OF POLY-CARBOXYLIC ACID AND A POLYMERIC POLYETHER
Keith L. Smith, South Charleston, Alfred E. Winslow, Scott Depot, and Edward C. Seltzer, St. Albans, W. Va., assignors to Union Carbide Corporation, a corporation of New York
Continuation of application Ser. No. 295,860, June 21, 1963, which is a continuation-in-part of application Ser. No. 759,656, Sept. 8, 1958. This application May 4, 1966, Ser. No. 547,673
13 Claims. (Cl. 260—874)

This application is a continuation of our earlier filed application Ser. No. 295,860, filed June 21, 1963, now abandoned, which was a continuation-in-part of application Ser. No. 759,656, filed Sept. 8, 1958, and application Ser. No. 650,092, filed Apr. 2, 1957, both of which are abandoned.

This invention relates to a variety of compositions which are association product of a polymeric carboxylic acid compound and a polymeric ether compound, particularly a polymeric ether compound as defined herein, having a molecular weight of at least 4000; methods for making such compositions; and a variety of uses and methods of using said compositions.

The compositions of this invention are products of chemical association between a polymeric polycarboxylic acid, as defined herein, and a polymeric polyether having an average molecular weight of at least 4000. The polymeric polyether desirably contains a plurality of alkylene oxide radicals or is a poly(alkenyl alkyl ether). Such chemical association products may possess many desirable properties, such as insolubility in cold and hot water, and therefore, are found useful in many applications.

The compositions of this invention are termed "association products" or "products of chemical association" since the polymeric polycarboxylic and the polymeric polyether do not appear to be interbonded by virtue of mechanisms such as esterification and additive (e.g., addition of olefinic compounds) reactions. Illustrative of this is the fact that certain compositions such as those resulting from polymeric carboxylic acids and poly(alkylene oxide), e.g., poly(ethylene oxide), which only possess carboxyl and hydroxyl groups as the potential functional groups, exhibit increased cross-linking when the amount of hydroxyl groups of the poly(alkylene oxide) is decreased and the molecular weight of the poly(alkylene oxied) is increased. This is evident from the composition's increased insolubility in hot water. Further discussion relative to the structure of the compositions of this invention will be made below.

The terms "polymeric carboxylic acid compound" or "polyacid" (these two terms will be employed interchangeably) in their broad aspect, as used herein including the appended claims, encompass those acidic polymeric materials in which the acidity is due to free carboxylic acid groups, i.e., —COOH groups. These "polyacids" are characterized in that they contain an average of from about 0.3 to about 1.7 free carboxylic acid groups per 100 molecular weight, and further, the polyacid molecules contain at least an average of about 10 free carboxylic acid groups.

The terms "an average of" or "at least an average of" are employed in the preceding description since the molecular weight or the number of free carboxylic acid groups found by analyzing the polyacid, in the usual instance, will be an average number or average value. For example, random copolymerization or terpolymerization, etc., will yield polymeric molecules of varying molecular weights (and varying functional groups depending on the monomers employed); consequently, the value assigned to the molecular weight of the polymeric sample (and/or to the functional groups contained by the polymeric molecules in the polymeric sample is recognized by the art to be an average number or average value. The average molecular weight of the polyacids contemplated in the instant invention is in the range of from about 600 to about 2,000,000, and higher. Representative polyacid species (and subgeneric classes of polyacids) will be thoroughly discussed in a later section.

By the terms "polymeric ether compound" or "polyether" (these two terms will be employed interchangeably) in their broad aspect, as used herein including the appended claims, are meant those polymeric materials from the classes indicated above which contain an average of from about 0.5 to 3.33 noncyclic aliphatic ether (or oxygen) groups (or atoms) (hereinafter termed "etheric atoms" or "etheric groups") per 100 molecular weight, and further, the polyether molecules contain at least an average of about 7 noncyclic aliphatic ether groups.

The term "noncyclic aliphatic ether groups" is employed in the above description to include only those ether groups found in the straight or branch organic chains of the polyether molecule. Thus, for example, poly(ethylene oxide) possesses the repetitive unit —$CH_2CH_2O$— in the polymer chain; the oxygen atom in this repetitive unit would be considered to be "noncyclic aliphatic ether groups." On the other hand, any oxygen atoms which form a portion of an organic ring such as, for example, the oxygen atom in tetrahydrofuran or the oxygen atoms in dioxane, are not to be counted or included as being "noncyclic aliphatic ether groups." The terms "an average of" or "at least an average of" are employed in the preceding description since the molecular weight or the number of etheric atoms found by analyzing the polyether, in the usual instance, will be an average value or average number.

The molecular weight of the polyethers contemplated in the instant invention is in the range of above about 4000 to about 8,000,000, and higher. Representative polyether species (and subgeneric classes of polyethers) will be illustrated hereinafter.

The process and the resulting association products, in their broad aspects, involve contacting the indicated polyether and polyacid under conditions and subsequent treatment as explained hereinafter such that a water-insoluble association product is produced. Thus, since the vast majority of the polyacids and polyethers contemplated in the instant invention are water-soluble compounds, the contacting of the polyacid component and polyether component can be effected by dissolving these components, in the desired concentration, in aqueous medium. It is preferred to dissolve the components separately in water, in the desired concentration, and subsequently to add one solution to the other. It has been observed that these components will generally remain in solution at room temperature when the pH of the solution is above about 3.5. Lowering the pH below about 3.5, and preferably below about 3.0, generally results in the formation of a precipitate, i.e., an association reaction product, within seconds or almost immediately. When the pH is decreased to about 2.0, or lower, precipitation of the association product is usually virtually complete. Precipitation is unusually pronounced as the molar ratio of etheric atoms (from the polyether) to free carboxylic groups (from the polyacid) approaches 1.0. This precipitate can be further insolubilized, for example, by baking at elevated temperatures, or by molding under pressure at elevated temperatures, etc.

It has further been observed that when the polyether, e.g., poly(ethylene glycol), has an average molecular weight in the range of above about 300 and below about 4000, and the polyacid, e.g., poly(acrylic acid), has a reduced viscosity greater than about 0.1 (determined from an aqueous solution containing 0.2 gram of polymer per 100 milliliters of water at 30° C.), an aqueous solution containing same does not result in the formation of a precipitate. On evaporation of the solution, e.g., at room temperature under reduced pressure, followed by baking the resulting residue at elevated temperatures, e.g., at 150° C. for a period of several minutes or hours, at least a portion of this residue is a water-insoluble fraction, i.e., an association product. However, it is desirable to employ a polyether having an average molecular weight above about 4000 to obtain the most beneficial results. It should be pointed out at this time that the association reaction products can again be solubilized by treatment, for example, with strong alkali such as an aqueous solution containing 10 weight percent sodium hydroxide or potassium hydroxide, and the like.

It should also be noted that when the polyacid component or polyether component is substantially water-insoluble, e.g., beta-carboxyethyl silicone polymer, poly(vinyl ethyl ether), and the like, the reaction can be conducted by first dispersing the water-insoluble component as a finely divided suspension in aqueous medium, and then mixing the resulting aqueous suspension with an aqueous solution or suspension containing the second component in the manner noted previously.

The nature of the reaction between the polymeric carboxylic acid compound and the polymeric ether compound is not fully appreciated and, therefore, the invention should not be limited by any theory of reaction mechanism such as that which follows. It is believed that the reaction involves one or more diverse mechanisms such as hydrogen bonding, electrostatic bonding, secondary valence forces, and the like. It appears that the phenomenon concerning hydrogen bonding can best explain the nature of the reaction. We have termed, as pointed out above, the reaction of the polyacid and polyether as an "association reaction"; the polyacid and polyether components as "associatable components"; and the resulting product as an "association reaction product" or "association product" or a "complex polymeric product," etc. It is pointed out that prolonged baking of the precipitate, i.e., the association product, provided it is short of degrading the product, indicates that water is not formed during the association. In short, on baking the association product the weight of the association product approaches the weight of the polyacid and polyether starting materials employed in preparing said association product.

As explained previously, the association reaction of the polyacid component with the polyether component preferably can be carried out by dissolving or dispersing these components separately in water, followed by mixing the resulting solutions or aqueous dispersions together. However, in several other embodiments of the instant invention, the association reaction of the polyacid component with the polyether component can be effected by various means. When employing the technique of dispersing or dissolving the polymeric components in liquid media, the molecular weight of the polyether generally should be above about 4000 in order for precipitation to become manifest at room temperature. When precipitation does not occur, evaporation of the liquid medium, e.g., by air-drying, followed by baking the resulting residue at elevated temperatures, e.g., 175° C. for 20 minutes, will produce a water-insoluble product, i.e., an association reaction product. In one embodiment the polymeric components can be dissolved in a mutual inert solvent. It is preferred, however, that the polymeric components be separately dissolved or suspended in a common inert solvent or different inert solvents, organic or inorganic in nature, which are miscible with each other, followed by mixing the resulting solutions or dispersions. In another embodiment, the polyacid and polyether components, if normally solid and hydrophilic, can be powdered and then added to an inert nonsolvent. Sufficient water can be added to the resulting liquid-solids admixture so that the hydrophilic polyacid and hydrophilic polyether absorb this water. Agitation of the admixture results in coalescence of the water-containing polyacid particles with the water-containing polyether particles. In this manner partial association occurs. Further association reaction products, i.e., water-insoluble products, can be obtained by intimate mixing of the admixture, by subjecting the admixture to mechanical treatment, e.g., two-roll mill, etc., by driving off the inert nonsolvent followed by baking at elevated temperatures, e.g., 150° C., and the like. In some instances when the polyether is a normally liquid compound, the association reaction can be conducted in the absence of a solvent or nonsolvent. In such cases the normally liquid polyether can serve as the continuous phase and the polyacid component can be the dispersed phase; upon baking at elevated temperatures a water-insoluble product is obtained. In a further embodiment the association reaction can be effected by purely mechanical means such as by admixing the finely divided associatable components together at elevated temperatures such as, for example, by the use of a two-roll mill, by use of calendering equipment, by molding under pressure, and the like.

Another aspect of the instant invention is directed toward maintaining the polyacid component and polyether component in solution, preferably in aqueous solution. This aspect involves both the process and the resulting composition. It has been observed, as indicated from the preceding discussion, that a pH above about 3.5 will often prevent precipitation of the association product in aqueous media. The instant invention also offers several means for maintaining the components in solution from which solutions useful films and coatings can be prepared. It has been observed that various agents (hereinafter termed "inhibitors" or "solubilizing agents") can prevent precipitation of the product in accordance with the teachings hereinafter set forth. The inhibitors contemplated include, among others, water-soluble ketones, e.g., acetone, methyl ethyl ketone, acetonylacetone, and the like; monoalkyl ethers of alkylene glycols, preferably the monolower alkyl ethers of ethylene glycol and propylene glycol, e.g., monomethyl ether of ethylene glycol, monoethyl ether of ethylene glycol, and the like; alkali metal bases such as the hydroxides, e.g., sodium hydroxide, potassium hydroxide, and the like; alkali metals salts of weak acids, e.g., sodium bicarbonate, sodium acetate, potassium carbonate, and the like; ammonia and water-soluble amino compounds, e.g., ethanolamine, ethylenediamine, triethanolamine, pyridine, piperazine, piperidine, trimethylamine, triethylamine, tri-isopropanolamine, and the like. Other inhibitors can be exemplified by compounds such as dioxane, diacetone alcohol, ethyl alcohol, dimethyl sulfoxide, acrylic acid monomer, acetic acid, hydrazine, adjustment of the pH of the solution, alcohols in general, and the like.

The amount of inhibitor or solubilizing agent necessary to prevent precipitation of the association product will depend on several considerations one or more of which is as follows: the particular polyacid component employed including its molecular weight, the number of free carboxyl groups contained by the polyacid, the concentration of the polyacid, the particular polyether component employed including its molecular weight, the number of etheric atoms contained by the polyether, the concentration of the polyether, the particular inhibitor or solubilizing agent of choice, and other factors. In general, an inhibiting amount or solubilizing amount of the above-exemplified compounds is employed, that is, an amount of inhibitor or solubilizing agent at least sufficient to prevent precipitation of the association product. In view of the teachings herein it can be readily determined by routine experimentation the quantity of inhibitor or solubilizing agent that is required to prevent precipitation.

It has been observed that when the above exemplified water-soluble ketones and monoalkyl ethers of alkylene glycols are employed to prevent precipitation, at least about 30 to 35 weight percent (of said ketone or glycol), based on the total solution weight, is required when the polyether, for example, is poly(ethylene oxide) with a reduced viscosity of about 1.0 or greater (as measured in water at a concentration of 0.2 gram of polymer per 100 milliliters of water at 30° C.) is employed. Lesser amounts of the above illustrated ketones or glycols are required as the number of ether groups (etheric atoms) in the polyether are decreased; the polyethers containing less than about 100 ether groups (etheric atoms) produce normally water-soluble polyacid-polyether materials.

With inhibitors or solubilizing agents such as the alkali metal hydroxides, the alkali metal salts of weak acids, ammonia, water-soluble amino compounds, and the like, the amount of the previously illustrated inhibitors which can be employed is sufficient to maintain the pH of the solution (containing the polymeric components) above about 3.5. The operator can readily determine the pH of the solution by conventional means. As specific examples, it has been observed that the approximate minimum amount of sodium hydroxide necessary to prevent precipitation is about 6.5 mole percent based on the molar equivalents of carboxyl groups. The optimum amount of ammonia to be used as an inhibitor is about 11 weight percent of that amount which is necessary to completely neutralize the polyacid component. The minimum amount of water-soluble amino compound, e.g., ethanolamine, necessary to prevent precipitation is about 6 mole percent based on moles of carboxyl groups.

The addition of ferric ion e.g., ferric chloride, to solutions containing the polyacid and polyether components dissolved therein which solutions are inhibited with an inhibiting or solubilizing amount of water-soluble ketones such as acetone, methyl ethyl ketone, acetonylacetone, and the like, will cause precipitation of the association product. This product can be recovered by conventional means such as filtration or decantation. When the technique of maintaining the solution above about a pH of 3.5 is employed such as by the addition of alkali metal hydroxides, alkali metal salts of weak acids, ammonia, water-soluble amino compounds, and the like, precipitation of the association product can be effected by adjusting the pH of the solution to about 3.0, and lower, preferably to a pH in the range of from about 2.0 to 3.0. Inorganic acids such as hydrochloric acid is satisfactory for lowering the pH of the solution. When precipitation of the association product from solution has been prevented by the incorporation therein of one of the above illustrated inorganic, basic or water-soluble amine inhibitors, evaporation of the solution to dryness, such as by air-drying or under reduced pressure, followed by baking the resulting residue, at elevated temperatures, will yield an associated product.

Various modes of incorporating or adding the inhibitor into the system can be employed. For instance, the inhibitor can be mixed with either the polyacid component and/or polyether component prior to forming separate solutions containing the polymeric component in question. Alternatively, the inhibitor can be added to a solution containing the polyacid and/or a solution containing the polyether prior to mixing both solutions. If desired, both solutions can be mixed in the absence of the inhibitor, and the resulting precipitate, if any, subsequently can be dissolved by adding, for example, a water-soluble ketone or monoalkyl ether of alkylene glycol to the system. In this case, it is preferred that the precipitate not be dried prior to the incorporation of the above-illustrated inhibitors which are employed to effect solution. The basic inhibitors, e.g., alkali metal hydroxides, alkali metal salts of weak acids, ammonia, water-soluble amino compounds, etc., are particularly suitable agents for adjusting the pH of the system within the range desired. Consequently, when such exemplified basic inhibitors are employed to maintain the pH of the solution above about 3.5, the subsequent acidification of the solution to decrease the pH thereof to about 3.0, and lower, will result in precipitation. Alternatively, a precipitated product can be returned to solution by the addition of the basic inhibitor thereto in an amount sufficient to bring the pH of the solution into the proper range, e.g., above about 3.5. In addition, when feasible, the polyacid component, e.g., poly(acrylic acid), poly(methacrylic acid), etc., can be used in the form of its basic salt or partial basic salt, e.g., alkali metal or ammonium salt of the polyacid in question. Should precipitation of the association product from solution not occur when employing the polyacid salt, acidifying the solution to the proper pH range will bring about precipitation of the association product.

The association product also can be obtained as an emulsion by the use of emulsifying agents.

The association products provided by the present invention have a variety of uses. They are water-insoluble, resistant to continuous water extraction for extended periods of time, acid resistant, and alkali-soluble. In general, these products are transparent, inherently flexible and require not plasticizers. However, if desired, plasticizers can be incorporated. An important advantage of the property of inherent flexibility in these products is that in an atmosphere of variable humidity this property remains relatively constant. Films made from the association products of this invention exhibit good resistance to hydrocarbons and greases. Additionally, these films adhere well to glass, metal, cellulosic material, and the like. The products exhibit good resistance to abrasion.

It has been observed that the solvent resistance of the products of this invention can be increased by subjecting them to elevated temperatures. In general, the baking or molding period will decrease as the temperature increases.

Weight loss of the association product which is incurred upon heating or baking depends to an extent upon the method employed in preparing the product, particularly the means used to inhibit the precipitation of the product, if any, and other considerations. In general, it has been observed that no substantial difference in the weight of the product made by the preferred methods as compared to the combined weight of the polyacid and polyether starting materials is apparent.

When water-soluble amino compounds, ammonia, alkali metal hydroxides, and alkali metal salts of weak acids such as those exemplified previously are used to prevent precipitation of the product, the residue obtained by air-drying the solution is essentially water-soluble. This residue becomes increasingly insoluble on baking at elevated temperatures, e.g., about 150° to 200° C. for a period of about 20 minutes.

By way of illustrations a film obtained by air-drying a solution inhibited with about 6 mole percent of ethanolamine (based on moles of carboxyl groups from the polyacid component) was essentially water-soluble and reamined so during a 20 minute bake at temperatures up to about 100° C. Increasing insolubility became apparent on baking at higher temperatures for the same period of time, and a maximum degree of insolubility was attained at temperatures in the range of from about 150° to 225° C. When ammonia was employed in an amount sufficient to neutralize 11% of the polyacid component, though the residue obtained by air-drying the solution was essentially water-soluble, water-insolubility was obtained by subjecting this residue to baking at elevated temperatures. A baking period of about 20 minutes at temperatures up to 125° C. produced hardly any change in the water-solubility characteristic of the residue. Increasing the baking temperature to about 175° C. for a period of about 20 minutes insolubilized above about 90 percent of the residue.

Thus, it can be readily appreciated that the residue obtained by evaporating solutions containing the polyether and polyacid components dissolved therein, which solutions are inhibited by ammonia, water-soluble amino compounds, alkali metal hydroxide, alkali metal salts of weak acids, and the like, can be converted from water-soluble to water-insoluble within a relatively narrow temperature range and within relatively short periods of time. This teaching represents another embodiment of the instant invention.

FIGURES 1, 2, and 3 depict graphically the effect of incorporating different inhibitors or solubilizing agents in aqueous media which contain the polyacid and polyether components dissolved therein, followed by evaporating, e.g., air-drying the aqueous solution, and then subjecting various samples of the residue (as a film) to 20 minute baking periods at different temperatures.

In FIGURE 1, the material subjected to the baking treatment was the material obtained from operative Example VI described hereinafter. The solubilizing agent employed was ammonia in an amount sufficient to prevent precipitation from the aqueous solution. It will be noted from a consideration of FIGURE 1 that increasing insolubility of various samples of this material was apparent as the 20 minute bake was conducted at increasingly higher temperatures up to a temperature range of about 175° to 200° C. After a 20 minute bake at approximately 175° C., about 92 weight percent of the material, based on its original weight, was insolubilized.

In FIGURE 2, the material subjected to the baking treatment was the material obtained from operative Example XXIX described hereinafter. The solubilizing agent employed was ethanolamine in an amount sufficient to prevent precipitation from the aqueous solution. As is apparent from a consideration of FIGURE 2, the insolubility of various samples of this material after 20 minute bakes at different temperature levels was at a maximum over the temperature range of from about 150° to 225° C.

In FIGURE 3, the material subjected to the baking treatment was the material obtained from operative Example XXX described hereinafter. The solubilizing agent employed was sodium hydroxide in an amount sufficient to prevent precipitation from the aqueous solution. It is readily apparent from FIGURE 3 that various samples of this material became increasingly insoluble by conducting the 20 minute bake period at increasingly higher temperatures.

In distinction to the water-soluble residues obtained on air-drying solutions inhibited by the alkali metal bases, ammonia, water-soluble amines, and the like, the products produced by air-drying solutions inhibited by the water-soluble ketones and monoalkyl ethers of alkylene glycols, e.g., acetone, methyl ethyl ketone, acetonylacetone, 2-methoxyethanol, 2-ethoxyethanol, and the like, are essentially water-insoluble provided that the polyether, e.g., poly(ethylene oxide), used had an average molecular weight of at least about 4000. The water-insolubility characteristic of these association products can be increased to some extent by baking. For instance, one preparation (Example IX) which was 93 weight percent insoluble without baking was 97 percent insoluble after baking at 200° C.

The association product can be recovered by a number of methods, some of which have been previously described. When a precipitate forms on mixing the solutions the precipitate can be recovered by known methods such as filtration or decantation. When mixing results in incomplete precipitation of the added polyether and polyacid a further yield of the product can be recovered by treating the solution with an acid. Hydrochloric acid is satisfactory for this purpose and a suitable pH range after treatment with acid is in the pH range of from about 2 to 3. When the precipitation has been inhibited, for example, by a water-soluble ketone or a monoalkyl ether of alkylene glycol such as illustrated previously, the association product can be recovered by drying the solution in the air or under a vacuum. If desired, recovery can be made by precipitating the product by such means as addition of ferric chloride in the case of acetone. Acidifying the solutions inhibited by water-soluble amines, ammonia, the alkali metal bases, or alkali metal salts of weak acids also serves to precipitate the product.

In the usual instance it is desirable to dry the precipitated product. This may be accomplished by air-drying or the baking methods previously described. Satisfactory results are also obtained by drying the product under vacuum.

The polymeric carboxylic acid compound contemplated as starting material can be expressed in terms of free carboxylic groups (—COOH) per 100 molecular weight. It should be remembered, however, that the instant invention is concerned with polymeric components, i.e., polyacid and polyether reagents, and those skilled in the polymer art will recognize that in the usual instance there will be a spread of molecular weights in a polymer sample (including, also, a spread in the number of functional groups be they carboxylic groups or etheric groups). Consequently, the number of functional groups or/and the molecular weights in a polymer sample is an average value or average number. Broadly, the average number of carboxylic groups per 100 molecular weight contained by the polyacid is in the range of from about 0.3 to 1.7. Preferably, this range is from about 0.5 to 1.6 carboxylic groups per 100 molecular weight, and still more preferably the range is from about 0.8 to 1.4 carboxylic groups per 100 molecular weight. These ranges have been judiciously chosen and are not to be considered arbitrary values. The lower limit of about 0.3 carboxylic group (per 100 molecular weight) encompasses polyacid components such as styrene-acrylic acid copolymer (Example XXXVII and carboxymethyl cellulose (Example XXXVIII). The most preferred lower limit of 0.8 carboxylic group includes polyacids such as beta-carboxyethyl silicone polymer and carboxymethyl dextran (approximately 0.87 and 0.90 carboxylic groups, respectively, per 100 molecular weight) which likewise are associatable components as is apparent from the operative examples. The upper limits of 1.4 and 1.6 include poly(acrylic acid) and maleic acid/acrylic acid copolymer, respectively. The polyacid contains at least an average of about 10 carboxylic groups, and preferably at least an average of about 100 carboxylic groups. The molecular weight range of the polyacid is from about 600 to about 2,000,000, and higher.

With reference to the polyacid component it can be said that the carboxylic acid groups should be attached to an organic polymer chain. Such chains can encompass the entire polymer as, for example, in poly(acrylic acid). The polyacid component can also be a graft or block copolymer, and in such instance the polymer chain containing the free carboxylic acid groups can be only a portion, preferably a major portion, of the chain length of the over-all polymer. The polyacid polymer chain can also be contained in a polymer such as those made from styrene and acrylic acid by adjusting the ratios of the comonomers during polymerization to produce a polymer with a polyacid polymer chain which is joined to a portion of the polymer composed largely or solely of polystyrene.

The polymeric carboxylic acid compound which can be employed as starting material include not only those polymers in which the polymeric structure is built up by synthetic means but also those in which the polymeric molecule is built up by nature. The polyacid reagent can be obtained by homopolymerizing monomeric unsaturated carboxylic acids such as acrylic acid, methacrylic acid, ethacrylic acid, alpha-chloroacrylic acid, and the like. The polyacid can also be prepared by copolymerizing a monocarboxylic acid of the acrylic series with polymerizable vinyl or vinylidene compounds such as styrene, vinyl toluene, vinyl benzoate, vinyl chloride, isobutylene, methacrolein, vinyl acetate, and the like. Polycarboxyalkyl poly(vinyl alcohols), e.g., polycarboxymethyl poly(vinyl alcohol), are also useful. Hydrolyzed interpolymers of alpha, beta-ethylenically unsaturated dicarboxylic acid anhydrides, e.g., maleic anhydride, with terminally unsaturated mono-olefins such as ethylene, propylene, diisobutylene, methylenecyclohexane, and the like; or with cyclic terpenes, e.g., dipentene; or with compounds capable of being polymerized and containing a single $CH_2=C<$ group such as vinyl and vinylidene compounds, e.g., vinyl esters, vinyl ethers, vinyl halides, styrene, acrylic acid and its esters, methacrylic acid and its esters, and the like, are also suitable as the polyacid component. The polyacid can also be prepared by carboxyalkylation, e.g., carboxymethylation, carboxyethylation, and the like, of polymers containing a multiplicity of hydroxyl groups such as cellulose and its derivatives, starch and its derivatives, dextran and its derivatives, poly(vinyl alcohol), partially hydrolyzed poly(vinyl acetate), and the like. Carboxyalkylation can be accomplished by methods well known such as by reaction with chloroacetic acid in the presence of alkali, or by reaction of acrylonitrile in the presence of an alkaline catalyst followed by subsequent hydrolysis of the nitrile groups. By the term "derivatives of" with respect to cellulose, starch, dextran, poly(vinyl alcohol), and the like, is meant any derivative having sufficient hydroxyl groups available for carboxyalkylation such as partially etherified derivatives, including hydroxyalkylated derivatives. The over-all composition of the polyacid component is not critical providing it contains from about 0.3 to 1.7 carboxylc acid groups per 100 molecular weight and at least an average of 10 carboxylic acid groups per polyacid molecule.

In Formulas I through IV to follow, there are illustrated the typical structural unit or group of some of the subgeneric classes of polyacids which are applicable as starting material in the instant invention. Of course, these formulas are by no means exhaustive of the polyacid subclasses which can be used.

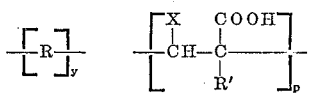

Wherein X can be hydrogen; halogen, e.g., chlorine bromine, and the like; lower alkyl, e.g., methyl, ethyl, propyl, and the like; carboxy; and amide; wherein R' can be hydrogen; halogen, e.g., chlorine, bromine, and the like; alkyl, e.g., methyl, ethyl, propyl, and the like; aryl, e.g., phenyl, tolyl, and the like; aralkyl, e.g., benzyl, phenethyl, and the like; carboxyalkyl, e.g., carboxymethyl, carboxyethyl, and the like; alkylol, e.g., methylol and the like; amide, nitrilo, and the like; wherein R can be the following: a divalent saturated organic radical containing solely carbon and hydrogen; a divalent saturated organic radical containing solely carbon, hydrogen, and oxygen; a divalent styrene radical; a divalent isobutylene radical; a divalent vinyl toluene radical; a divalent vinyl ester radical, e.g., divalent radicals of vinyl acetate, vinyl formate, vinyl propionate, and the like; a divalent vinyl halide radical, e.g., divalent radicals of vinyl chloride, vinyl bromide, and the like; a divalent acrylate ester radical, e.g., divalent radicals of methyl acrylate, ethyl acrylate, and the like; a divalent methacrylate ester radical, e.g. divalent radical of methyl methacrylate, ethyl methacrylate, and the like; a divalent acrylonitrile radical; a divalent methacrylonitrile radical; a divalent terminally unsaturated olefin radical, e.g., ethylene, propylene, butylene, and the like; a divalent vinyl alcohol radical such as obtained by hydrolysis of the vinyl ester moiety; and the like. Wherein $p$ is an integer at least as great as 5 when X is carboxyl, and at least as great as 10 when X is hydrogen; wherein $y$ is an integer limited according to the value of $p$; wherein the ratio of $y$ to $p$ has values as follows: when X is carboxyl the ratio of $y$ to $p$ is in the range of from 0 to 5, preferably from 0 to 3; when X is hydrogen the ratio of $y$ to $p$ is in the range of from 0 to 2; preferably from 0 to 1.

II

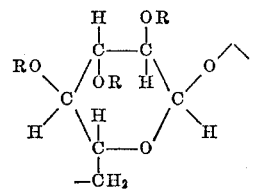

Wherein R can be hydrogen; alkyl, e.g., methyl, ethyl, and the like; carboxyalkyl, e.g., carboxymethyl, carboxyethyl, and the like; carboxyalkyloxyalkylene, e.g., carboxyethyl, carboxymethoxypropyl, carboxyethoxyethyl, and the like; the polymer containing the above typical structural unit having on the average at least 0.3 carboxylic acid groups per 100 molecular weight.

III

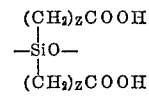

Wherein each Z, individually is an integer in the range of from 1 to 9.

IV

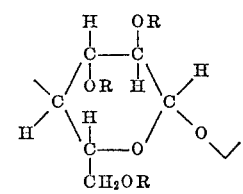

Wherein R can be hydrogen; alkyl, e.g., methyl, ethyl, and the like; carboxyalkyl, e.g., carboxymethyl, carboxyethyl, and the like; carboxyalkyloxyalkylene, e.g., carboxymethoxyethyl, carboxymethoxypropyl, carboxyethoxyethyl, and the like; the polymer containing the above typical structural unit having on the average at least 0.3 carboxylic acid groups per 100 molecular weight.

As is apparent from a consideration of, for example, structural Formula I supra the polyacid component can have end groups attached to the polymer acid portion of the polyacid component such as carboxylic ester, inorganic ester, ether, halogen, amide, amine, acetal, hemiacetal, aldehyde, carboxylic, and the like. The prescribed concentration of pendant carboxylic acid groups along the polymer acid chain (which can be a portion of the overall polymer chain comprising the polyacid molecule) is essential for the polyacid-polyether interaction and the interaction will thus take place independently of end groups. Numerous subgroups can also be tolerated as segments of the backbone polymer chain such as sulfonamide, amine, amide, ester, ketone, ether, sulfoxide, sulfone, acetal, hemiacetal, and silicon atoms. Of course, the above-said end groups and subgroups are realistically limited by the broad range of free carboxylic acid groups per 100 molecular weight, i.e., 0.3 to 1.7 free carboxylic acid groups per 100 molecular weight. In arriving at the average molecular weight of the polyacid component in question, the weight of each and every atom comprising the polyacid molecule is included; the number of free carboxylic acid groups contained in the polyacid molecule is known beforehand or it can be readily determined by well-known analytical procedures. From this information, the number of free carboxylic acid groups per 100 molecular weight is readily determined by simple arithmetical calculation. As stated previously, the polyacid component contains at least an average of 10 free carboxylic groups, preferably at least an average of 100 free carboxylic groups, per polyacid molecule.

In another aspect the polyacid contains, on the average, at least 1 carboxylic acid group per each 6 atoms in the polymer chain. It is preferred that the polyacid contain, on the average, at least 1 carboxylic acid group per each 4 atoms in the polymer chain. It is desirable that the polymer chain be composed solely of carbon atoms.

The polymeric ether compound contemplated as starting material can be expressed in terms of non-cyclic aliphatic ether (or oxygen) groups (or atoms) for sake of brevity the terms "etheric atoms" or "etheric groups" are employed throughout) per 100 molecular weight. As stated in the beginning of this disclosure only those etheric atoms found in the straight or branch chains of the polyether molecule are counted; the oxygen atoms forming a part of an organic ring in the polyether molecule are excluded. Broadly, the number of non-cyclic aliphatic ether groups per 100 molecular weight contained by the polyether is in the range of from about 0.5 to 3.33. Preferably, this range is from about 0.5 to 2.85 etheric groups per 100 molecular weight, and still more preferably the range is from about 0.5 to 2.3 etheric groups per 100 molecular weight. A highly desirable range is from about 1.0 to 2.3 etheric groups per 100 molecular weight, and an especially preferred range is from about 1.5 to 2.3 etheric groups per 100 molecular weight.

The poly(alkylene oxides), such as, poly(ethylene oxide) having a reduced viscosity above about 0.5 (at a concentration of 0.2 gram of polymer in 100 milliliters of acetonitrile at 30° C.), are eminently preferred. Such poly(ethylene oxides) are hard, tough, horny, resinous materials. The polyether component contains at least an average of 7 etheric groups, preferably at least an average of 40 etheric groups, and still more preferably at least an average of 100 etheric groups. In a highly preferred embodiment the polyether component contains at least an average of 1000 etheric groups, this minimum limit, i.e., 1000 etheric groups, being approximately the point where poly(ethylene oxide) is a resinous compound such as described above.

The polyethers contemplated include, for example, the poly(alkylene oxides) prepared by polymerizing ethylene oxide, propylene oxide, epoxybutane, tetrahydrofuran, and the like, and mixtures thereof; the polyoxyalkylene polyol adducts and ethers thereof such as can be made by reacting ethylene oxide, propylene oxide, etc., and mixtures thereof, with small amounts of hydroxylated compounds such as aliphatic alcohols, glycols, phenols, glycerol, sorbitol, and the like. Resinous homopolymers of 1,2-alkylene oxides as well as resinous copolymers of an admixture of 1,2-alkylene oxides (with reduced viscosities of at least 0.5, and preferably at least 1.0 as determined from a solution containing 0.2 gram of polymer in 100 milliliters of solvent such as acetonitrile at 30° C.) are highly preferred classes of polyethers. The 1,2-alkylene oxides can be, for example, ethylene oxide, propylene oxide, the epoxybutanes, the epoxypentanes, styrene oxide, chlorostyrene oxide, and the like. Polyethers prepared by reacting ethylene oxide, propylene oxide, and other olefin oxides with synthetic and naturally occurring polymeric materials such as the polyvinyl alcohol, starches, and the like are suitable as are the polyethers prepared by the reaction of, for example, ethylene oxide and propylene oxide with the glucosides and sugars, e.g., sucrose, glucose, and the like. The polyvinyl alkyl ethers are also suitable as the polyether component. Moreover, polyethylene glycol and polypropylene glycol and ethylene oxide-propylene oxide copolymer glycols which have been reacted with a diisocyanate or a diepoxide such as diglycidyl diether of a bisphenol to provide long chain polyether components are also suitable.

In Formulas V through XI to follow, there are illustrated structurally some of the subgeneric classes of polyethers (or their typical structural unit or group) which are applicable as starting material in the instant invention. Of course, these formulas are by no means exhaustive of the polyether subclasses which can be used.

V          R(A)$_x$R' wherein A can be oxyalkylene, e.g., oxyethylene, oxypropylene, oxybutylene, oxytrimethylene, oxytetramethylene, and the like; wherein R is attached to the oxygen atom of A and can be hydrogen; a hydrocarbon radical, e.g., alkyl, alkenyl, cycloalkyl, aryl, alkaryl, aralkyl, and the like; and wherein R' is attached to a carbon atom of A and can be hydrogen; halogen, e.g., chlorine, bromine, and the like; a hydrocarbon radical, e.g., alkyl, alkenyl, cycloalkyl, aryl, alkaryl, aralkyl, and the like. In addition, R' can be alkoxy, aryloxy, and the like; and wherein $x$ has a value of at least 7.

VI         R(B)$_y$  (C)$_z$R' wherein B and C are different oxyalkylene radicals such as oxyethylene, oxybutylene, oxypropylene, oxypentylene, oxystyrene, and the like; wherein each R and R', individually, can be hydrogen; a hydrocarbon radical, e.g., alkyl, cycloalkyl, alkenyl, aryl, aralkyl, alkaryl, and the like. In addition, R and R', individually, when attached to a carbon atom of B or C can be halogen, e.g., chlorine, bromine, and the like; alkoxy, aryloxy, and the like; and wherein $y$ and $z$ are numbers having a minimum value of 1, and the sum of $y$ and $z$ is at least 7.

VII

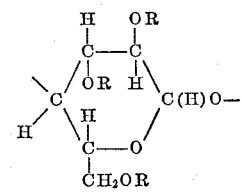

wherein R can be alkyl, e.g., methyl, ethyl, propyl, and the like; or one of the following groups:

(a) 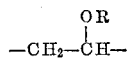

(b) 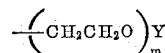

(c) 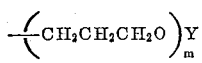

wherein Y can be hydrogen or a hydrocarbon radical, e.g., alkyl; and $m$ is an integer and can vary from one R to another; and wherein the polymer containing the above typical structural unit has on the average at least 0.5 etheric atom per 100 molecular weight.

VIII

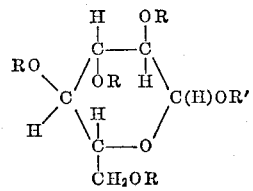

wherein each R, individually, can be one of the following groups:

(a) 

(b) 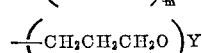

(c) 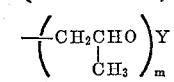

wherein Y can be hydrogen or a monovalent hydrocarbon radical, e.g., alkyl; and $m$ is an integer typically of at least 2 and can vary from one R to another; and wherein the polymer containing the above typical structural unit has on the average at least 0.5 etheric atom per 100 molecular weight.

IX

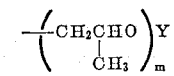

wherein R can be hydrogen, and wherein each R and R', individually, can be one of the following groups:

(a) 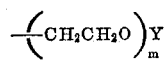

(b) 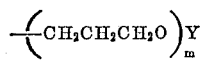

(c) 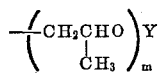

wherein Y can be hydrogen or a hydrocarbon radical, e.g., alkyl; and $m$ is an integer, typically at least 2, and can vary from one R to another; and wherein the polymer structurally represented above contains on the average at least 0.5 etheric atom per 100 molecular weight.

X

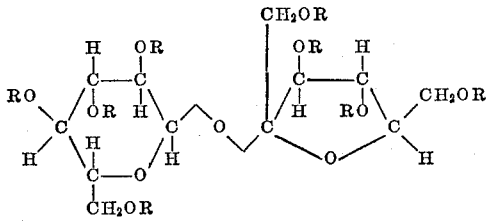

wherein each R, individually, can be one of the following groups.

(a) 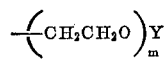

(b) 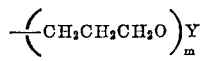

(c) 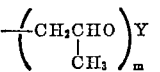

wherein Y can be hydrogen or a hydrocarbon radical, e.g., alkyl; and $m$ is an integer, typically at least 2, and can vary from one R to another; and wherein the polymer structurally represented above contains on the average at least 0.5 etheric atom per 100 molecular weight.

XI

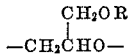

wherein R can be alkyl, e.g., methyl, ethyl, propyl, and the like; or one of the following groups:

(a) 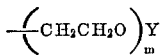

(b) 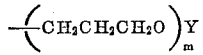

(c) 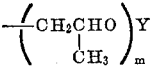

wherein Y can be hydrogen or a hydrocarbon radical, e.g., alkyl; and $m$ is an integer and can vary from one R to another; and wherein the polymer structurally represented above contains on the average at least 0.5 etheric atom per 100 molecular weight.

In another aspect the polyether contains, on the average, at least 1 etheric group per each 6 carbon atoms. It is preferred that the polyether contains, on the average, at least 1 etheric group per each 4 carbon atoms. The polyether preferably contains above about 100 etheric groups for the obtention of a normally insoluble product without baking.

It is convenient in the instance of polymeric materials to indicate molecular weights by way of recourse to the reduced viscosity of a polymer sample. The reduced viscosities referred to herein were all measured at a concentration of 0.2 gram of polymer per 100 milliliters of water at a temperature of 30° C., unless otherwise indicated.

Another embodiment of the instant invention is directed to the preparation of novel adhesive compositions which comprise a water-soluble or water-insoluble polymeric ether compound and a water-insoluble polymeric carboxylic acid compound which contains an aliphatic alpha, beta-ethylenically unsaturated carboxylic acid polymerized therein, said polymeric ether compound containing, on the average, at least about 10 non-cyclic aliphatic ether groups (preferably at least) about 100 non-cyclic aliphatic ether groups) and from about 0.5 to 2.85 (preferably from about 1.0 to 2.3) non-cyclic aliphatic ether groups per 100 molecular weight, and said polymeric carboxylic acid compound containing, on the average, at least about 10 carboxylic acid groups and at least 0.3 carboxylic group per 100 molecular weight, preferably at least about 0.3 and less than about 1.0 carboxylic acid group per 100 molecular weight. In preparing the adhesive compositions the ratio of the polymeric components can vary over a wide range. For instance, a highly effective and desirable pressure-sensitive adhesive can be prepared from 50 parts by weight of resinous poly(ethylene oxide), i.e., poly(ethylene oxide) having a reduced viscosity of at least 1.0 as measured at 30° C. in 100 milliliters of acetonitrile which contains 0.2 gram of the polymer dissolved therein, and 50 parts by weight of a water-insoluble copolymer of styrene and acrylic acid; note operative Examples XXXVI and XXXVII. By way of a further illustration, an eminently suitable adhesive composition can be prepared from 80 parts by weight of poly(vinyl ethyl ether) and 20 parts by weight of a copolymer of styrene and acrylic acid; note operative Example XL. Illustrative polymeric ether compounds which are contemplated include, among others, poly(alkylene oxides), e.g., poly(ethylene oxide), poly(propylene oxide), and the like; copolymers of dissimilar 1,2-alkylene oxides, e.g., 50/50 copolymer of ethylene oxide and propylene oxide, 80/20 copolymer of ethylene oxide and butylene oxide, and the like; poly(vinyl alkyl ethers), e.g., poly(vinyl methyl ether), poly(vinyl ethyl ether), and the like; and others. The water-insoluble polymeric carboxylic acid compounds which are amenable as components in the adhesive compositions include, for example, copolymers of aliphatic alpha, beta-ethylenically unsaturated carboxylic acids and ethylenically-unsaturated hydrocarbons. Illustrative aliphatic alpha, beta-ethylenically unsaturated carboxylic acids include acrylic acid, methacrylic acid, maleic acid, ethacrylic acid, alpha-chloroacrylic acid, and the like. Illustrative ethylenically unsaturated hydrocarbons include compounds from the mono- and di-olefinic series including aryl-substituted olefins, and the like, for example, ethylene, propylene, butylene, butadiene, styrene, and the like. In general, the water-insoluble polymeric carboxylic acid compound will contain more than 50 weight percent of the ethylenically-unsaturated hydrocarbon monomer polymerized therein. It is preferred that solid to resinous poly(alkylene oxides) or poly(vinyl alkyl ethers) be employed as the polymeric ether component, and that solid copolymers of an aliphatic alpha, beta-ethylenically unsaturated carboxylic acid and an ethylenically-unsaturated hydrocarbon be employed as the polymeric carboxylic acid component such as copolymers of styrene and acrylic acid. It is readily appreciated that the optimum ratio for each combination of polymeric components will very according to the polymeric components of choice; consequently, no simple rule of thumb can be given. However, in the light of the teachings contained in this disclosure, one can ascertain the optimum ratio of the polymeric components by merely testing the pressure-sensitiveness of the resulting adhesive composition. When the polymeric ether component is water-insoluble, e.g., poly(vinyl ethyl ether), it is desirable that the adhesive composition contain a major proportion of the water-insoluble polymeric ether component, and a minor proportion of the water-insoluble polymeric carboxylic acid component. When the polymeric ether component is water-soluble, e.g., resinous poly(ethylene oxide), desirable adhesive compositions can be obtained by varying either polymeric component over a wide range, e.g., from 10 to 90 weight percent, preferably from 25 to 75 weight percent, based on the total weight of the polymeric components.

To prepare the pressure-sensitive adhesive compositions each polymeric component, for example, can be separately dissolved in an inert organic solvent (which can be the same solvent or different solvents which are miscible), followed by admixing the resulting solutions together, and subsequently evaporating the organic solvent(s) therefrom such as by air-drying or under reduced pressure. The resulting residue is a pressure-sensitive adhesive composition. If desired, the solution containing the polymeric components dissolved therein can be applied to a surface as a thin coating which upon evaporation of the solvent therefrom will result in a pressure-sensitive adhesive layer thereon. The various means set out supra for effecting intimate contacting of the polymeric components are applicable.

The polymeric polyethers preferred in the practice of this invention are, for example, those such as the poly(alkylene oxides) with an average molecular weight of about 4000 and above, including the polyethylene glycols, poly(ethylene oxide) with a reduced viscosity of at least 1, copolymers of ethylene oxide and propylene oxide, and the like, and polymers made by linking together two or more polyalkylene glycol chains by using chain-linking agents such as diepoxides or diisocyanates, and polyvinyl alkyl(methyl, ethyl, etc.) ethers, all of these polymers having average molecular weights of at least 4000.

Also preferred are the polyhydroxyalkylated monohydroxy and polyhydroxy compounds, for example, such as those made by the reaction of simple alcohols and phenols, glycols, triols, such as glycerol, and the like, with ethylene oxide, and the like, or mixtures of ethylene oxide, propylene oxide, and the like and which contain major proportions by weight of ethylene oxide radical, polyhydroxyalkylated aliphatic and aromatic polyhydroxy compounds such as polyhydroxyethylated glucosides, sucrose, starch, etc., made by reaction of, for example, glucosides, sucrose, starch, etc., with ethylene oxide, propylene oxide and mixtures thereof, to form adducts which contain major proportions by weight of ethylene oxide and/or propylene oxide radical.

The polymeric polyethers with average molecular weights above 4000 are eminently well-suited for use in our invention. These include poly(alkylene oxides), e.g., poly(ethylene oxide) polymers with reduced viscosities of 0.1, preferably 1.0 and greater, polyethylene glycols and polyalkylene glycols made from mixtures of ethylene oxide and propylene oxide containing 40 percent or less by weight of propylene oxide, all having average molecular weights of at least 4000 which value encompasses the above reduced viscosities. The polyethers such as polyhydroxyalkylated adducts made by reacting glucosides, sucrose, starch, etc., with ethylene oxide and/or propylene oxide are particularly well-suited to the production of polyether-polyacid products when the adducts, e.g., from starch and the like, contain an average of at least 2.5 non-cyclic aliphatic ether groups per hydroxyl group originally therein.

The poly(ethylene oxide) polymers with reduced viscosities greater than 1 are particularly useful when it is desired to produce polyether-polyacid association products with increased tensile strength, stiffness, and hardness and to lower the elongation of the products.

The polyacids preferred for use in our invention have reduced viscosities of at least 0.1 and are, for example, poly(acrylic acids); poly(methacrylic acids); copolymers or terpolymers of acrylic acid and/or methacrylic acid with maleic anhydride; polymers containing 1 or more of these acidic monomers copolymerized with one or more of the noncarboxyl-containing olefins; e.g., styrene, vinyl acetate, vinyl chloride, acrylonitrile, isobutylene, and the like.

The polyacids particularly preferred in the practice of the present invention have reduced viscosities greater than 1 and are, for example, poly(acrylic acids); poly(methacrylic acids); copolymers made from maleic anhydride with acrylic, methacrylic acid and the like; copolymers of acrylic acid with 20 percent or less by weight of copolymerized styrene, vinyl acetate, vinyl chloride, acrylonitrile, isobutylene, and the like, copolymers of methacrylic acid with 20 percent or less by weight of polymerized styrene, vinyl acetate, vinyl chloride, acrylonitrile, isobutylene and the like, and copolymers made from maleic anhydride containing 20 percent or less by weight of copolymerized styrene, vinyl acetate, vinyl chloride, acrylonitrile, isobutylene and the like.

Particularly preferred, polyether-polyacid association products can be made from the following exemplary combinations of polyethers and polyacids: poly(ethylene oxide) with a reduced viscosity of at least 1 and poly(acrylic acid) with a reduced viscosity of at least 0.1; poly(ethylene oxide) with a reduced viscosity of at least 1 and poly(methacrylic acid) with a reduced viscosity of at least 0.1; poly(ethylene oxide) with a reduced viscosity of at least 1 with copolymers and terpolymers of acrylic acid and/or methacrylic acid with maleic anhydride with reduced viscosities of at least 0.1; poly(ethylene oxide) with a reduced viscosity of at least 1 and copolymers of acrylic acid and 20 percent or less by weight of copolymerized styrene, vinyl acetate, vinyl chloride, acrylonitrile, or isobutylene; poly(ethylene oxide) and copolymers of methacrylic acid and 20 percent or less by weight of copolymerized styrene, vinyl acetate, vinyl chloride, acrylonitrile or isobutylene all with reduced viscosities of at least 0.1; poly(ethylene oxide) with a reduced viscosity of at least 1 and copolymers of maleic acid and 20 percent or less by weight of styrene, vinyl acetate, vinyl chloride, acrylonitrile, or isobutylene with reduced viscosities of at least 0.1.

A particularly desirable association product which provides a non-creep pressure-sensitive adhesive, is one formed between a copolymer of acrylic acid and styrene, and poly(vinyl ethyl ether), particularly when the ether polymer has a reduced viscosity greater than about 1, preferably about 4 to 6. The copolymer may have from 20 to 80 weight percent acrylic acid with the remainder being styrene. Such association products make excellent pressure-sensitive adhesives which are free of creep even at temperatures above 100° F.

Polyether-polyacid association products with eminently desirable properties can be made using the following combinations of polyethers and polyacids: poly(ethylene oxide) with a reduced viscosity of at least 1 and poly(acrylic acid) with a reduced viscosity of at least 1; poly(ethylene oxide) with a reduced viscosity of at least 1 and poly(methacrylic acid) with a reduced viscosity of at least 1; poly(ethylene oxide) with a reduced viscosity of at least 1 and copolymers or terpolymers of arcylic acid and/or methacrylic acid with maleic acid having reduced viscosities of at least 1; polyethylene glycols with average molecular weights of at least 4000 and poly(acrylic acid) with a reduced viscosity of at least 1; polyethylene glycols with average molecular weights of at least 4000 and poly(methacrylic acid) with a reduced viscosity of at least 1; polyethylene glycols with average molecular weights of at least 4000 and copolymers or terpolymers of acrylic acid and/or methacrylic acid with maleic acid with reduced viscosities of at least 1; polyalkylene glycols made from 60 percent or more by weight of ethylene oxide and 40 percent or less by weight of propylene oxide with average molecular weights of at least 4000 and poly(acrylic acid) with a reduced viscosity of at least 1; polyalkylene glycols with average molecular weights of at least 4000 made from 60 percent or more by weight of ethylene oxide and 40 percent or less by weight of propylene oxide and poly(methacrylic acid) with a reduced viscosity of at least 1; polyalkylene glycols with average molecular weights of at least 4000 made from 60 percent or more by weight of ethylene oxide and 40 percent by weight or less of propylene oxide and copolymers or terpolymers of acrylic acid and/or methacrylic acid with maleic acid with reduced viscosities of at least 1; polyhydroxyethylated starch containing, on the average, at least 2.5 non-cyclic aliphatic ether atoms per hydroxyl group originally on the starch and an average molecular weight of at least 4000, and poly(acrylic acid) with a reduced viscosity of at least 1; polyhydroxyethylated starch containing, on the average, at least 2.5 noncyclic aliphatic ether atoms per hydroxyl group originally on the starch and an average molecular weight of at least 4000, and poly(methacrylic acid) with a reduced viscosity of at least 1; polyhydroxyethylated starch and copolymers or terpolymers of acrylic acid and/or methacrylic acid with maleic acid having reduced viscosities of at least 1; polyhydroxyethylated glucosides and poly(acrylic acid) with a reduced viscosity of at least 1; polyhydroxyethylated glucosides and poly(methacrylic acid) with a reduced viscosity of at least 1; the polyhydroxyethylated glucosides and copolymers or terpolymers of acrylic acid and/or methacrylic acid with maleic acid having reduced viscosities of at least 1; polyhydroxyethylated sucrose with poly(acrylic acid) with a reduced viscosity of at least 1; polyhydroxyethylated sucrose with poly(methacrylic acid) with a reduced viscosity of at least 1; and polyhydroxyethylated sucrose and copolymers or terpolymers of acrylic acid and/or methacrylic acid with maleic acid having reduced viscosities of at least 1.

As stated previously, the nature of the interaction between the polyacid and the polyether is not completely clear. Minor amounts of one polymeric component, e.g., one part by weight and lower, with major amounts of the other polymeric component, e.g., 99 parts by weight and higher, have been observed to associate to form association products in accordance with the teachings herein set forth. In general, the concentrations of the polyether should be in the range of from about 3 parts by weight, and lower, to about 93 parts by weight, and higher, whereas the concentrations of the polyacid should be in the range of from about 7 parts by weight, and lower, to about 97 parts by weight, and higher, as was evidenced by the formation of water-insoluble products which were not dissolved in extracting baked films of the polyether polyacid products for 8 hours with boiling water in a Soxhlet extractor.

The effect of the interaction is pronounced at ratios of polyacid to polyether in the range from 93 parts by weight to 19 parts by weight of the polyacid to from 7 to 81 parts by weight of the polyether. At ratios of 93 parts by weight of polyacid to 7 parts by weight of polyether and of 19 parts by weight of polyacid to 81 parts by weight of the polyether, about 40 weight percent, or more of the baked films remains undissolved after 8 hours treatment with boiling water in a Soxhlet extractor.

The preferred range of ratios, of from 80 to 25 parts by weight of the polyacid to 20 to 75 parts by weight of the polyether, produces greater amounts of insoluble product, that is, about 70 weight percent, or more, of the product remains undissolved after 8 hours extraction with boiling water.

The optimum range of ratios of polyacid to polyether is between about 30 to 60 parts by weight of the polyacid to about 70 to 40 parts by weight of the polyether. In this instance of the order of 85 to 99 percent of the weight of the baked films remains after 8 hours extraction with boiling water in a Soxhlet extractor.

The number of ether groups in the polyether appears to effect the solubility of the polyether-polyacid products in that when the number of polyether groups is about 100, as in the instance of polyethylene glycol with an average molecular weight of about 4000, the products obtained are normally water-insoluble, whereas polyethers possessing lower molecular weights and ether group content are appreciably more soluble, particularly in hot water.

The effect of increased molecular weight of the polyether on the polyether-polyacid products in the instance of the linear polyethers tends toward increased tensile strength, increased stiffness and hardness, and decreased elongation of the products.

The effect of increased molecular weight in the polyacid polymer chain can be illustrated by the instance of polyacrylic acid. The preferred molecular weight range in this instance corresponds to a reduced viscosity of about 1 or greater when measured at a concentration of 0.2 gram of polymer in 100 milliliters of water at 30° C. Little change in the water-solubility of a poly(acrylic acid)-poly(ethylene oxide) association product is observed with increased reduced viscosity above a reduced viscosity of about 1. However, the resistance of the poly(acrylic acid)-poly(ethylene oxide) association products to extraction with boiling water begins to fall off rapidly at reduced viscosities less than about 1. Nonetheless, the baked poly(acrylic acid)-poly(ethylene oxide) association products made with poly(acrylic acid) with a reduced viscosity as low as 0.1 still show a major proportion by weight of an unextractable product after 8 hours treatment with boiling water in a Soxhlet extractor.

The polyether-polyacid association products herein described can be prepared in the presence of or can have added to them substantial, even major proportions, of materials which do not form any part of the polyether-polyacid association product per se and can be produced in the presence of materials which do not form part of the polyether-polyacid association product provided the materials do not exert an inhibiting affect on the preparation of the product. Such materials, though inert with respect to polyether-polyacid products and their preparation, nonetheless, are useful additives. Inert additives such as these include solvents for the reactants and auxiliary components as previously described; fillers such as calcium carbonate, the neutral clays, mica, carbon blacks, and wood flour; plasticizers and softening agents for the reaction components or reaction products such as water, high-boiling simple alcohols, diols, and triols; and dyes, pigments, surfactants, humectants, dispersants, flatting agents, and similar materials.

Illustratively, a substantially water-insoluble product can be obtained by mixing 90 parts by weight of calcium carbonate filler, 95 parts by weight of water, 5 parts by weight of poly(ethylene oxide) and 5 parts by weight of poly(acrylic acid). With the higher molecular weight poly(acrylic acids) and higher molecular weight poly(ethylene oxides), even higher filler loadings can be obtained by similar methods, particularly if the pH is adjusted so as to maximize the insolubility of the polyether-polyacid products.

Similarly, the products can be produced in the presence of large amounts of solvent. In water, the polyether-polyacid association products formed from the higher molecular weight poly(ethylene oxides) and poly(acrylic acids) precipitate at concentrations of the product as low as 0.1 percent by weight of the solution. Under strongly acid conditions (a pH of about 2) the product precipitates at concentrations as low as 0.02 percent by weight of the solution.

When the polyether-polyacid association products are precipitated from water in the absence of any inhibitors, the polyether-polyacid product is deposited as a solvent-swollen, paste-like material which can be directly used to form coatings as by dip-coating, knife-coating, or roll coating; they can be foamed or blown by the techniques utilized for paste or organosol compositions and can be mixed with inert fillers, dyes, pigments, plasticizers, softeners and the like.

Many of the polyethers described are known materials and are readily available. The examples show the preparation of some of the less readily available materials. The higher molecular weight polymers of ethylene oxide, propylene oxide, and the like, copolymers thereof, and copolymers of ethylene oxide, propylene oxide, and the like, with the other lower olefin oxides, e.g., the epoxybutanes, the epoxy pentanes, styrene oxide, etc., can be prepared by various methods, such as disclosed in U.S. Patent 2,987,489, to F. N. Hill and F. E. Bailey, Jr. entitled "Polymerization of Epoxides," and assigned to the same assignee as the present invention; U.S. patent application of F. N. Hill, J. T. Fitzpatrick, and F. E. Bailey, Jr., entitled "Process for the Polymerization of Epoxides," Ser. No. 776,408, filed Nov. 26, 1958, (U.S. Patent No. 3,100,750) and assigned to the same assignee as the present invention; and U.S. Patent 2,971,988, to F. N. Hill, J. T. Fitzpatrick, and F. E. Bailey, Jr. and assigned to the same assignee as the present invention. Methods for making high polymers of propylene oxide, and copolymers of propylene oxide with other lower olefin oxides and styrene oxide are shown in U.S. Patents 2,706,181; 2,706,182 and 2,706,189.

In addition, ethylene oxide polymers which have been molecularly degraded to a reduced viscosity above about 1.0 by the reaction with a halogenating agent such as an alkali metal hypochlorite or alkaline earth metal hypochlorite can be employed as the polyether component. The molecular degradation of poly(ethylene oxide) via treatment with a halogen or halgen liberating compound is the subject matter of application of Ser. No. 231,853, (U.S. Patent No. 3,311,569) entitled "Halogen Modified Poly(Alkylene Oxide) Resins," by K. L. Smith et al., filed Oct. 19, 1962, assigned to the same assignee as the instant application. Each and every application referred to previously is hereby incorporated by reference.

In a number of the examples, which follow, samples were extracted with boiling water. The extractions were effected by using a thimble 144 mm. long made from 36 mm. diameter Pyrex tubing. The thimble contained 10 solvent outlet ports, 3 mm. in diameter, on the upper 66 mm. portion of the thimble which was covered with 325 mesh stainless steel filter cloth attached with nichrome wire. A funnel with an upper dimension of 20 to 22 mm. with a stem made from 8 mm. Pyrex tubing rested on the upper edge of the thimble, the bottom of the funnel being 2 to 6 mm. from the bottom of the thimble. In operation, the sample was placed in the thimble and the funnel, positioned to catch the condensate, was placed in a Soxhlet extractor. The funnel continually reecived hot condensate from an overhead condenser. The condensate flowed over the sample and out the outlet ports where it collected in the interannular volume between the thimble and the Soxhlet extractor where it was periodically removed and returned to the flask to be reheated and returned to the condenser. The water used in each extraction test was 500 cubic centimeters and it was boiled in a one liter flask heated by an electric heating mantle connected to a variable voltage transformer. The water moving over the samples remained at an average temperature of 90° C. In the apparatus used, the reflux rate was calculated to be 5.0 cubic centimeters per minute by dividing the interannular volume between the thimble and the extractor wall by the reflux time, which is the time internal required for the continuously condensing solvent to refill the interannular space after the time of solvent removal by the siphon on the Soxhlet extractor. Generally, the undissolved sample weight was determined by subtraction of the original thimble weight from the combined weight of the extracted sample and thimble after baking them to constant weight in a forced draft oven at 120° C.

In the following illustrative examples the term "percent" has been generally employed for "percent by weight." Also, the term "mm." designates "millimeters of mercury."

Example I

IA

The poly(ethylene oxide), used as a 5.0 percent aqueous solution, had a reduced viscosity in acetonitrile at 30° C. of 2.0. A 19.7 percent aqueous poly(acrylic acid) solution, with specific gravity at 20/20° C. of 1.072 and absolute viscosity at 20° C. of 1310 centipoises was diluted with water to a concentration of 14.8 percent for use in this experiment. Addition of 50 grams of poly (acrylic acid) solution and 100 grams of water to 150 grams of the poly(ethylene oxide) solution resulted in the formation of a large white precipitate. This product was removed from the supernatant liquid by decantation and baked to dryness at 70° C. in an oven. Plotting temperature-time data obtained by heating a sample of the dry product in a test tube and continually recording the temperature with a recording potentiometer showed no indication of a melting point. A break in the curve occurred at the characteristic melting range (in the vicinity of 60° C.) for poly(ethylene oxide).

IB

Fifty grams of the 14.8 percent poly(acrylic acid) solution was added and mixed manually with 150 grams of the 5.0 percent poly(ethylene oxide) solution in an open container. A precipitate formed almost immediately which was removed and baked to dryness at 300° F. in a constant temperature oven. Insolubility of the product was demonstrated in all cases when small samples were agitated overnight by rotation on can rolls in bottles with each of the following solvents: water, toluene, acetonitrile, acetone, benzene, and dimethyl formamide.

Example II

To an aqueous solution of 26.226 grams containing 4.85 percent poly(ethylene oxide) of reduced viscosity 4.34 (30° C., water) in a Soxhlet extraction thimble was added 4.02 grams of an aqueous solution containing 31.71 percent poly(acrylic acid) of reduced viscosity 0.2 (30° C., water). The addition took place at room temperature. A white percipitate formed almost immediately. The mixture was stirred without loss of precipitate. The polymer weights on a dry basis were 1.272 grams of poly(ethylene oxide) and 1.275 grams of poly(acrylic acid). The precipitate did not dissolve when subjected to Soxhlet extraction for 8.0 hours with water. The insoluble portion after drying to constant weight at 100° C. amounted to 1.553 grams, or 60.9 percent of the original contained solids weight. Repetition of the procedure gave a result of 58.9 percent unextracted material. In this case the original amounts of the two polymer solutions were 26.230 grams for poly(ethylene oxide) and 4.01 grams for poly(acrylic acid).

Example III

Inhibition by acetone is demonstrated in this experiment.

The stock solutions of reactants used here were the same as those used in Example I. A solution sample weighing 108 grams prepared by dilution of 200 grams of the 14.8 percent poly(acrylic acid) solution with 200 grams of acetone, was mixed with 100 grams of the 5.0 percent poly(ethylene oxide) solution to give a clear, colorless solution. A sample of this solution, after casting on a glass slide, partially air-drying and baking for 2 hours in an oven at 300° F., gave a clear film which was insoluble in water.

Example IV

This example shows a series of extractions of films in which the controlled variable was the reduced viscosity of the poly(acrylic acid). The polyacid samples were first combined with poly(ethylene oxide) of a standard batch in aqueous solutions which contained ethylene glycol monoethyl ether or acetone to prevent precipitation of the products. The compositions of the solutions are contained in the accompanying table.

Two samples of each solution were weighed in aluminum weighing cups having a diameter of 2.0 inches and allowed to form air-dried films by standing overnight. The resulting clear films were baked in a constant temperature oven for 2.0 hours at 150° C., cooled in desiccators and reweighed.

Each film, while still attached to the aluminum and weighing approximately 0.25 gram, was extracted for 8.0 hours with boiling water in Soxhlet extractors. The weighing cups were first divided into two parts and reshaped in order to fit them into an extraction thimble. Upon completion of the extraction, the samples with their respective cups and thimbles were dried to constant weight in an oven at 100° C. during approximately 21 hours. Weights of the dry, used weighing cups were obtained after removal of the undissolved samples from the aluminum by soaking in a 50–50 water-acetone mixture and rubbing. The undissolved sample weight was determined by subtraction of the combined weights of the used weighing cup and thimble from the total of extracted sample, weighing cup and thimble. Extraction results are tabulated in the following Table 1.

Example V

This experiment consists of a series of extractions of association product films in which the controlled variable was the reduced viscosity of the poly(ethylene oxide) or polyethylene glycol. These polyethers were first combined with poly(acrylic acid) in aqueous solutions which usually contained ethylene glycol monoethyl ether in order to prevent an immediate precipitation of a product. The compositions of these solutions are contained in the following Table 2.

Two samples of each solution were weighed in aluminum weighing cups having a diameter of 2.0 inches and allowed to form air-dried films by standing open to the room for sixteen hours. The resulting clear films were then baked in a forced draft constant temperature over for 2.0 hours at 150° C., cooled in desiccators, and reweighed.

TABLE 1.—POLY(ETHYLENE OXIDE)-POLY(ACRYLIC ACID) PRODUCTS: EFFECT OF REDUCED VISCOSITY OF POLY (ACRYLIC ACID) COMPONENTS ON SOXHLET EXTRACTION RESISTANCE OF PRODUCTS

| Solution Composition | Solution Sample Number | | | | | | | | | |
|---|---|---|---|---|---|---|---|---|---|---|
| | 1 | | 2 | | 3 | | 4 | | 5 | |
| | $I_r$[1] | Weight percent | $I_r$ | Weight percent | $I_r$ | Weight percent | $I_r$ | Weight percent | $I_r$ | Weight percent |
| Poly(acrylic acid) | 0.2 | 2.50 | 1.40 | 2.56 | 1.84 | 2.54 | 3.39 | 2.50 | 3.62 | 2.50 |
| Poly(ethylene oxide)[2] | | 2.50 | | 2.50 | | 2.50 | | 2.50 | | 2.50 |
| "Cellosolve" solvent[3] | | 35.00 | | 35.00 | | 35.00 | | 35.00 | | 35.00 |
| Water | | 60.00 | | 59.94 | | 59.96 | | 60.00 | | 60.00 |
| Total | | 100.00 | | 100.00 | | 100.00 | | 100.00 | | 100.00 |
| Soxhlet extraction, undissolved sample based on baked sample weight (percent), duplicate samples. | 73.11 71.18 | | 86.52 84.99 | | 87.71 85.85 | | 87.09 | | 82.89 84.36 | |

| Solution Composition | Solution Sample Number | | | | | | | | | |
|---|---|---|---|---|---|---|---|---|---|---|
| | 6 | | 7 | | 8 | | 9 | | 10 | |
| | $I_r$[1] | Weight percent | $I_r$ | Weight percent | $I_r$ | Weight percent | $I_r$ | Weight percent | $I_r$ | Weight percent |
| Poly(acrylic acid) | 4.50 | 2.50 | 4.85 | 2.07 | 5.64 | 2.50 | 71.4 | 2.50 | 14.4 | 1.615 |
| Poly(ethylene oxide)[2] | | 2.50 | | 2.07 | | 2.50 | | 2.50 | | 1.615 |
| "Cellosolve" solvent[3] | | 35.00 | | 35.00 | | 35.00 | | 35.00 | | |
| Acetone | | | | | | | | | | 30.000 |
| Water | | 60.00 | | 60.86 | | 60.00 | | 60.00 | | 66.770 |
| Total | | 100.00 | | 100.00 | | 100.00 | | 100.00 | | 100.000 |
| Soxhlet extraction, undissolved sample based on baked sample weight (percent), duplicate samples. | 90.64 89.95 | | 86.06 86.93 | | 92.17 91.60 | | 88.09 87.16 | | 83.97 86.95 | |

[1] $I_r$ is the reduced viscosity measured in water at 30° C., using a concentration of 0.20 gram per 100 cubic centimeters of solution.
[2] Poly(ethylene oxide) having a reduced viscosity of 4.46 in water at 30° C., was used in all 10 solutions.
[3] "Cellosolve" solvent is ethylene glycol monoethyl ether.

TABLE 2.—POLYOXYETHYLENE-POLY(ACRYLIC AICD) ASSOCIATION PRODUCTS: EFFECT OF REDUCED VISCOSITY OF POLYOXYETHYLENE COMPONENT ON SOXHLET EXTRACTION RESISTANCE OF PRODUCTS

| Solution Composition | Solution Number | | | | |
|---|---|---|---|---|---|
| | 1 | 2 | 3 | 4 | 5 |
| Polyethylene glycol, weight percent | 14.65 | 12.8 | 12.85 | 8.30 | 7.85 |
| Molecular weight | [1]300 | [1]600 | [1]1,000 | [1]4,000 | |
| $I_r$[2] | 0.02 | 0.06 | 0.06 | 0.10 | [3]0.41 |
| Poly(acrylic acid),[4] weight percent | 14.65 | 12.8 | 12.85 | 8.30 | 7.85 |
| Water, weight percent | 70.70 | 74.4 | 74.30 | 48.40 | 49.40 |
| "Cellosolve" solvent,[5] weight percent | | | | [6]35.00 | 34.90 |
| Total, weight percent | 100.00 | 100.00 | 100.00 | 100.00 | 100.00 |
| Soxhlet extraction, undissolved sample based on baked sample weight (percent), duplicate samples. | 87.1 84.6 | 86.75 89.00 | 89.8 90.4 | 90.7 91.0 | 90.5 |

| Solution Composition | Solution Sample Number | | | | |
|---|---|---|---|---|---|
| | 6 | 7 | 8 | 9 | 10 |
| Poly(ethylene oxide), weight percent | 1.97 | 2.50 | 1.925 | 1.918 | 0.948 |
| $I_r$ | 2.56 | 4.46 | 7.06 | 10.5 | 14.1 |
| Poly(acrylic acid), weight percent | 1.97 | 2.50 | 1.925 | 1.918 | 0.948 |
| Water, weight percent | 46.10 | 60.00 | 46.100 | 46.130 | 48.100 |
| "Cellosolve" solvent, weight percent | 49.96 | 35.00 | 50.050 | 50.030 | 50.000 |
| Total, weight percent | 100.00 | 100.00 | 100.000 | 100.000 | 100.000 |
| Soxhlet extraction undissolved sample based on baked sample weight (percent), duplicate samples. | 88.4 83.6 | 90.6 89.8 | 80.3 80.9 | 79.6 81.4 | 78.2 79.7 |

[1] Indicates average molecular weight.
[2] $I_r$ is the reduced viscosity in water at 30° C., measured at a concentration of 0.20 gram per 100 cubic centimeters of solution.
[3] Reaction product of a polyethylene glycol with an average molecular weight of 6,000 and the diglycidyl ether of diphenylolpropane.
[4] Poly(acrylic acid) with a reduced viscosity of 1.9 in water at 30° C., was used in all 10 solutions.
[5] "Cellosolve" solvent is ethylene glycol monoethyl ether.
[6] Fifty-seven percent of the poly(acrylic acid) solution (17.2 percent solids) was added to the polyethylene glycol solution (49.7 percent solids) before the formation of a precipitate indicated the need of a precipitation inhibitor.

The baked films, while still attached to the aluminum and weighing 0.1402 to 0.2665 gram were extracted for 8.0 hours with boiling water in Soxhlet extractors. The weighing cups were first divided into two parts and reshaped in order to fit them into the extraction thimbles. Upon completion of the extractions, in which the reflux rates ranged from 5.0 to 5.8 cubic centimeters per minute, the samples with their respective cups and thimbles were dried to constant weight in the over at a temperature range of 98° to 120° C. Weights of the dry, used weighing cups were obtained after removal of the undissolved samples from the aluminum by soaking in 50–50 water-acetone and rubbing. The undissolved sample weight was determined by subtraction of the combined weights of the used weighing cup and thimble from the total of extracted sample, weighing cup and thimble. The results are tabulated in the above table along with compositions of the source solutions.

Example VI

This example shows inhibition of precipitation with ammonia.

A viscous, clear, aqueous solution with pH of 3.70 was prepared by adding the following materials, in the order given, to a one-quart jar and mixing them overnight: 167.2 grams of aqueous poly(acrylic acid); 200 grams of distilled water; 39.4 cubic centimeters of 1.0 N ammonium hydroxide; and 250.0 grams of 8.01 percent aqueous poly(ethylene oxide). The poly(acrylic acid) solution containing 16.52 percent solids had a pH of 2.28 and a reduced viscosity of 1.9; the poly(ethylene oxide) solution contained an 8.01 percent concentration of a polymer which had a reduced viscosity of 5.03 in water at 30° C. The weight ratio of polyether to polyacid was 42:58.

A film prepared by air-drying 6.8340 grams of this solution for four days in a 4-oz. bottle weighed 0.5580 gram and was clear, flexible, and light-colored. The film completely dissolved at room temperature when agitated with 111.6 grams of water during a 48-hour period.

A nearly identical film prepared by air-drying 6.7918 grams of the same solution for four days was baked for 20 minutes at 175° C. in a constant temperature oven. The resulting film, weighing 0.5025 gram, represented 100.5 percent of the 0.4999 gram of solids calculated to be in the original solution sample. Extraction of this sample by water was carried out by adding 100.5 grams of water to the sample in the 4-oz. bottle and rotating the bottle for 48 hours. The remaining insoluble gel was filtered on a 200-mesh screen, washed, transferred to an aluminum weighing cup, and dried in about 18 hours to constant weight in a forced draft, constant temperature oven at 120° C. The dry unextracted material, weighing 0.4591 gram, represented 91.8 percent of the contained solids in the original sample.

Example VII

The poly(acrylic acid) solution used in this experiment had an observed solids content of 24.24 percent, reduced viscosity 1.13 (30° C., water), and an equivalent weight 72.8, obtained by titration of a sample (theoretical equivalent weight is 72.0). Addition of 420 grams of $\frac{3}{16}$-inch by $\frac{3}{16}$-inch cylinders of poly(ethylene oxide) (reduced viscosity 5.0), 3437 grams of distilled water, and 6250 grams of acetone to 2393 grams of the aqueous 24.24 percent poly(acrylic acid) solution contained in a five-gallon can followed by mixing by rotation on can rolls for 7 days gave a clear, colorless, rather viscous solution. The solids content of this solution was calculated as 8.0 percent and when converted to a dry basis consisted of 42 percent poly-ethylene oxide) and 58 percent poly(acrylic acid). Casting of five liquid films having a thickness of 78 mils on "Teflon"-coated Fiberglas cloth supported by 14-inch by 18-inch glass slides, followed by air-drying overnight and additional drying for 17.5 hours in a vacuum oven at 50° C. heated by circulating water at 60° C. and operated at a negative pressure of 29 inches mercury produced clear, tough, rough-surfaced films. Treatment of these films between surfaces of "Teflon"-coated cloth for twenty minutes at 180° C. and a pressure of 400 to 450 p.s.i. resulted in clear, tough, nearly colorless flexible films with an embossed surface. Wrinkles induced by tightly crumpling the films by hand disappeared quickly when the stress was removed. Six samples of one film with average thickness of 5.8 mils were tested on an inclined plane Scott Tensile Tester Model 1P4 manufactured by Scott Testers, Incorporated, Providence, R.I. The average observed tensile strength was 3525 p.s.i., and the elongation, 475 percent.

One of the five films which was 11 mils thick was tested for grease resistance by the following procedure. On the sample, which rested on a white desk blotter on a smooth plane surface, was placed 5.0 grams of sand screened to pass an 18-mesh screen and be retained on a 30-mesh screen. The area covered by the sand was controlled with the aid of a 1½-inch length of 1-inch internal diameter copper pipe temporarily placed vertically on the sample to act as a funnel and retainer for the sand. A test solution was prepared by adding 5 grams of anhydrous calcium chloride, and 1.0 grams of National Oil Pink B Dye (National Aniline and Chemical Company, Incorporated, Chicago, Ill.) to 100 cubic centimeters of double rectified turpentine (USP), agitating the mixture by rotation overnight, and removing the calcium chloride by filtration through filter paper. After adding 1.1 milliliters of this test solution to the sand resting on the test film and covering the sand and turpentine solution with an inverted 4-oz. bottle to retard evaporation, none of the red solution had stained through the specimen to the blotter within the observation period of seven days. A faint pink stain remained after removing the sand and rinsing the treated area with turpentine.

A 12-mil film of the poly(ethylene oxide) used as a component to make the film tested above was obtained by air-drying an aqueous 8.01 percent solution of the polymer on a glass slide for seven days. It was treated for grease resistance as described above. Although no stain had reached the blotter after seven days of exposure to the turpentine solution, a dark red stain remained after removing the sand and thoroughly rinsing the treated area with turpentine. Some red color could be removed from the reverse side of the film by rubbing with a piece of turpentine-soaked cotton.

Example VIII

The poly(ethylene oxide) used in this experiment contained 1 percent by weight of N,N,N′,N′,-tetrakis(2-hydroxypropyl)ethylenediamine added as a stabilizer, and had been dried in a vacuum extruder. An aqueous solution was prepared by mixing 960 grams of the dried and stabilized resin, in the form of approximately $\frac{3}{16}$ inch by $\frac{3}{16}$ inch cylinders, with 11,040 cubic centimeters of water for six days in a bottle rotated by can rolls at room temperature. The solids content of the solution was determined to be 7.95 percent by evaporating approximately 15-gram samples in triplicate in aluminum weighing cups in a constant temperature oven at 70° C., and drying the polymer at this temperature to constant weight. The reduced viscosiy of the contained polymer as measured in a Ubbelohde viscometer was 6.43 in water at 30.0° C. at a concentration of 0.20 gram per 100 cubic centimeters of solution.

The solids content of the aqueous poly(acrylic acid) solution sample used for this experiment was determined to be 16.52 percent by evaporating approximately 3-gram samples in triplicate in aluminum weighing cups in a constant temperature oven at 150 C., and drying the polymer at this temperature to constant weight. The reduced viscosity of the contained polymer as measured in a Ubbelohde viscometer was 1.86 in water at 30.0° C. at a concentration of 0.20 gram per 100 cubic centimeters of solution. The equivalent weight of the polymer, determined by titration with standard sodium hydroxide, was 74.2; the theoretical equivalent weight is 72.06.

Mixing for two days of 288.0 grams of the aqueous poly(acrylic acid) solution described, 32.0 grams of the aqueous poly(ethylene oxide) solution described, and 213.0 grams of acetone in a one-quart bottle rotated by can rolls gave a clear solution from which 508 grams was separated for evaporation and drying. This materal, containing a calculated total of 48 grams of solids, was dried in a tray lined with "Teflon"-coated Fiberglas cloth in a vacuum oven for 65 hours to give 51.0 grams of a translucent, very brittle solid. The oven, during this period, was maintained at a negative pressure of 29 inches of mercury, and was heated by circulating water at 76° C. through shelf channels.

The product was formed into a bar of dimensions ½-inch by ½-inch by 5-inches for determination of mechanical properities, by molding at a pressure of 2500 p.s.i. on the sample, and at a temperature of 180° C. for 10 minutes immediately followed by 150° C. for additional 110 minutes.

Material remaining from the tests, after being granulated in a mortar and screened to a size range of 9 to 16 mesh, was allowed to stand exposed in a room under constant conditions of 25° C. and 50 percent relative humidity for 5 days. A sample of this solid weighing 0.5711 gram was mixed 48 hours with water equaling two hundred times the sample weight (114 grams) in a 4-oz. bottle rotated by can rolls at 30° C. The remaining insoluble gel, after separation from the water with a 200-mesh screen, was dried to a constant weight of 0.2429 gram at 100° C.

A 0.5699 gram sample of the dried, translucent, brittle, unmolded product, which had been screened, humidified, and extracted in this same way, gave only 0.0118 gram of unextracted material when it was dried to constant weight at 100° C.

Example IX

A clear, viscous aqueous solution with calculated solids of 5.71 percent was prepared by adding the following materials in the order given, to a 5-gallon can and mixing them overnight: 3510 grams of aqueous poly(acrylic acid) solution, 5250 grams of aqueous poly(ethylene oxide), and 8760 grams of acetone. The poly(acrylic acid) solution containing 16.52 percent solids was the same as that used in Example VIII; the poly(ethylene oxide) solution contained an 8.01 percent concentration of a polymer which had a reduced viscosity of 5.0 in water at 38° C. The weight ratio of polyether as polyacid was 42:58.

A film prepared by air-drying 8.8120 grams of this solution in a 4-oz. bottle for four days weighed 0.5621 gram and was light tan, clear and flexible. Its weight represented 111.7 percent of the calculated contained solids in the original solution. Extraction of this sample by water was carried out by adding 112 grams of water to the sample in the bottle and rotating for 48 hours. The remaining insoluble gel was filtered on a 200-mesh screen, washed, transferred to an aluminum weighing cup and dried in about 18 hours to constant weight in a constant temperature oven at 100° C. The dry unextracted material, weighing 0.4684 gram, represented 93.1 percent of the contained solids in the original sample.

In a similar manner, 8.8792 grams of the stock solution, after air-drying four days in a 4-oz. bottle, yielded a flexible film which in this case was baked 20 minutes at 200° C. in a constant temperature oven before extraction. The resulting film, weighing 0.5144 gram or 101.5 percent of the calculated solids weight percent, was extracted with 103 grams of water following the procedure described in the preceding paragraph. A final value of 96.8 percent unextractable material based on contained solids in the original sample was obtained.

Example X

To 90.0 grams of aqueous 3.87 percent poly(ethylene oxide) solution free of stabilizers and with reduced viscosity in water at 30° C. of 5.2 was added 30.0 grams of an aqueous 9.93 percent solution of poly(acrylic acid) with a reduced viscosity of 1.9, and 30.0 grams of acetone. The mixture was agitated overnight to form a light amber colored, clear solution which was calculated to contain 53.9 percent poly(ethylene oxide) and 46.1 percent poly(acrylic acid) on a dry basis. A clear, air-dried 0.5020 gram film obtained after drying for 4 days 11.6260 grams of the stock solution was dried further in a 4-oz. bottle by baking at a temperature of 150° C. for 1.0 hour. The resultant 0.4329 gram sample lost only 0.0088 gram (2.0 percent) additional weight when baked 7 additional hours at the same temperature. The baked film was then extracted 48 hours with 85.0 grams of water in the standard room temperature water extraction test and yielded, after drying to constant weight during approximately 18 hours at 150° C., 0.3644 gram of clear, tough, unextracted material. This was 84.2 percent of the initial baked film weight.

Example XI

Poly(ethylene oxide) and poly(acrylic acid) powders were mixed on a two-roll mill and baked to form a water-insoluble film.

Poly(ethylene oxide) with a reduced viscosity in water of 53.0 at 30° C. was screened to less than 35 mesh, and was found by analysis to contain 0.6 percent volatile matter by drying duplicate samples in vacuo at 50° C. to constant weight. Poly(acrylic acid) powder was prepared by drying an aqueous solution of poly(acrylic acid), having a reduced viscosity of 1.9 in water at 30° C. at a concentration of 0.2 gram of polymer in 100 ml. of water, on trays at 65° C. under a reduced pressure of 24 inches of mercury. The resultant colorless glass-like material was broken in a mortar and ground with one-half inch steel balls in porcelain one-quart ball mills. The powdered material was screened through a 60-mesh screen. That passing the screen was determined to have a moisture content of 6.4 percent by weight by drying to a constant weight at 150° C. and a reduced viscosity under the conditions recited above of about 1.0. The powder was with difficulty soluble in water.

A sample of the poly(ethylene oxide) powder weighing 20.0 grams was blended with 21.37 grams of the powdered poly(acrylic acid). Fluxing the blended powder on a two-roll mill for 5 minutes at 90° C. to 100° C. produced a smooth, tan sheet, 14 mils thick, which upon cooling had the appearance of stiff, translucent paper. The material whitened when folded and creased, and was water-soluble. Baking a portion of this sheet for 30 minutes in an oven at 150° C. gave a brown, nearly opaque product which was more resilient and did not whiten when creased.

A sample of the baked material weighing 0.5423 gram was mixed 48 hours with water equaling two hundred times the sample weight (108.0 grams) in a 4-oz. bottle rotated by can rolls at 30° C. The film remained intact and was swelled to a weight of 2.4770 grams; drying to constant weight at 150° C. gave a final weight of 0.3788 gram of undissolved sample.

Example XII

The starting material consisted of an aqueous 1.0 percent solution of poly(ethylene oxide) with reduced viscosity of 6.43 (water, 30° C.) and an aqueous 1.0 percent solution of poly(acrylic acid) with reduced viscosity of 1.9. While stirring 1250 grams of the poly(ethylene oxide) solution in a four-liter beaker with a three-blade, three-inch paddle at 925 r.p.m., gradual addition of 1250 grams of the poly(acrylic acid) solution during 1.0 hour at a temperature of 24.9 to 26.4° C. resulted in the formation of a finely divided, amorphous, light colored precipitate. The presence of a precipitate was first observed at the end of the first ¾ of an hour when a total of 311.0 grams of the poly(acrylic acid) solution had been added. The milkiness of the supernatant liquid persisted when the mixture was transferred to a one-gallon jug and agitated by rotation for three days. The precipitate was separated by decantation and dried on a sheet of "Teflon"-coated cloth from an initial wet weight of 21.5 grams to an air-dried weight of 4.36 grams after being exposed in the room for 14 days. A sample of this tough, flexible solid weighing 0.6419 gram was further dried in an open 4-oz. bottle by baking for one hour at 150° C. to give a final weight of 0.6099 gram. The portion of this product remaining undissolved after submission to extraction for 48 hours with 122.0 grams of water in the standard room temperature water extraction test, after transfer to an aluminum weighing cup (wet weight 1.694 grams) and drying to constant weight at 150° C., weighed 0.5723 gram. This insoluble portion corresponds to 93.8 percent of the baked sample weight. When a similar sample of the air-dried product was baked in an aluminum weighing cup at 150° C. for a total of 9.5 hours, the initial weight of 0.5285 gram dropped to 0.5012 gram at the end of the first two hours, and to a final weight of 0.4913 gram. The sample lost only 2.0 percent of its weight during the final 7.5 hours.

The milky supernatant liquid after quantitative transfer to a four-liter beaker with the aid of additional distilled water for rinsing purposes, had a weight of 2620 grams, and a pH of 3.40. While stirring this liquid with the three-blade, three-inch paddle at 650 r.p.m. gradual addition of 150 cubic centimeters of 0.1 normal hydrochloric acid during 50 minutes and at room temperature produced a large, amorphous light yellow precipitate. A clear supernatant liquid, and apparent complete precipitation appeared after the first 25 minutes of addition when a total of 50 cubic centimeters of the acid had been added, and the pH of the clear liquid was 2.90. The final pH of the clear liquid was 2.33. The precipitate was separated by decantation and air-dried on a sheet of "Teflon"-coated cloth from its initial wet weight of 90.0 grams to a final weight of 18.2 grams after 14 days. Samples of this flexible, tough solid were treated according to the same procedures used for samples of the first precipitate, and the accumulated data are summarized in a table which is to follow.

The remaining clear liquid, weighing 2732 grams and contained in a tray lined with "Teflon"-coated Fiberglas cloth was evaporated to dryness during 14 days with the aid of a draft created by an electric fan. The residue of 2.7 grams, which consisted of solid, nearly white, brittle flakes, was sampled and tested according to the procedures just described. Results are summarized in the following table.

| Prod. No. | Air-dried sample weight, g. | Weight after baking 1 hour, g. | Unextracted portion based on baked sample weight, percent | Sample weight after baking 9.5 hours×100÷ weight after baking 2 hrs., percent |
|---|---|---|---|---|
| 1 | 0.6419 | 0.6099 | 93.8 | |
| 1 | 0.5285 | ¹0.5012 | | 98.0 |
| 2 | 0.7012 | 0.6444 | ²93.2 | |
| 2 | 0.5361 | ¹0.4920 | | 98.7 |
| 3 | 0.7437 | 0.7211 | 5.0 | |
| 3 | 0.5526 | ¹0.5341 | | 83.7 |

¹ Baked sample weight after two hours, g.
² Wet sample weight after extraction was 1.5551 g., and dry weight, 0.6001 g.

Example XIII

Heat instability of unassociated poly(ethylene oxide) is demonstrated in this example by its loss of weight when heated at about 150° C.

The poly(ethylene oxide) employed was in the form of cylindrical pellets of dimensions 3/16 inch by 3/16 inch and contained 0.5 percent by weight of propyl gallate as a stabilizer. A quantity of the poly(ethylene oxide) pellets weighing 139 grams was dried to a constant weight of 137.3 grams during 18 hours at 100° C. A 5.0 percent aqueous poly(ethylene oxide) solution was obtained by dissolving 75.0 grams of the dry poly(ethylene oxide) in 1425 grams of water at room temperature. Measurement of the reduced viscosity of the polymer in the usual manner gave a value of 4.35 at 20° C. in water.

Two samples of the above solution, contained in aluminum weighing cups, were evaporated to dryness and baked in a constant temperature oven at 147° C. to 155° C. for 5.1 hours. Periodically these samples were removed from the oven, allowed to cool in a desiccator, and weighed in order to determine weight losses during the baking process. The observed weight losses are tabulated in the following Table 3.

TABLE 3.—HEAT INSTABILITY OF POLY(ETHYLENE OXIDE) AS INDICATED BY WEIGHT LOSSES DURING BAKING

| Total baking time at 147° C. to 155° C., hours | Solution sample wt., grams | Contained polymer, grams | Baked film wt., grams | Residue wt. based on original contained polymer, percent |
|---|---|---|---|---|
| Sample No. 1 | | | | |
| 1.00 | 5.2616 | 0.2631 | 0.2234 | 84.9 |
| 2.42 | | | 0.1169 | 44.4 |
| 4.42 | | | 0.0347 | 13.2 |
| 5.09 | | | 0.0255 | 9.7 |
| Sample No. 2 | | | | |
| 1.00 | 5.1670 | 0.2583 | 0.2222 | 86.0 |
| 2.42 | | | 0.1261 | 48.8 |
| 4.42 | | | 0.0460 | 17.8 |
| 5.09 | | | 0.0030 | 1.2 |

Example XIV

A series of association product films prepared from a common stock solution was submitted to baking times ranging from 30 minutes to 10 hours for the purpose of observing the effect of these baking conditions on product film weight losses, and on boiling water extraction resistances of the baked products.

To a solution prepared by mixing 20.95 grams of an aqueous poly(acrylic acid) solution containing 19.54 percent total solids with 26.24 grams of acetone was added 50.0 grams of poly(ethylene oxide) solution containing 5.0 percent solids. Rotation of this mixture in a 4-oz. bottle for 30 minutes gave a clear, homogeneous solution having a calculated solids content of 6.785 percent.

The aqueous solutions of polymeric starting materials can be further described. The 19.54 percent poly(acrylic acid) solution was prepared by adding 600 grams of distilled water to 150 grams of solid, granular poly(acrylic acid) with a reduced viscosity, in water at 20° C. at 0.2 gram per 100 milliliters of 0.5 and mixing for one day to form a clear, colorless solution. The total solids value was determined from three solution samples weighing approximately 1 gram each by drying them at 150° C. to constant weight during a time of 5.5 hours and averaging the results. The poly(ethylene oxide) solution was the same as that described in Example XIV.

A clear, flexible film was prepared by air-drying a sample of the above solution weighing 4.7834 grams for 16 hours in an aluminum weighing cup having a diameter of 2.0 inches. This film was baked for 10.0 hours in a constant temperature oven at 147° C. to 155° C. The baked film, which weighed 0.3139 gram, was equivalent to 96.7 percent of the calculated solids content in the original solution sample of 0.3245 gram. The baked film, while still attached to the aluminum cup, was extracted for 8.0 hours with boiling water in a Soxhlet extractor. The weighing cup was first divided into two parts and reshaped in order to fit it into the extraction thimble. Upon completion of the extraction, the sample while still adhering to the aluminum cup and contained in the thimble, was dried to constant weight in an oven at a temperature range of 100° C. to 108° C. The undissolved sample weight was determined by subtraction of the combined weight of the weighing cup and thimble from the total of extracted sample, weighing cup and thimble. Six additional association product films prepared from the same stock solution were submitted to baking times ranging from 30 minutes of 7.0 hours. The baked products were tested to demonstrate heat stability and boiling water extraction resistance according to the procedures just described. Results from all seven samples are tabulated in the accompanying Table 4.

having a few slightly hazy spots resulted which did not change in appearance appreciably after baking for 110 minutes at 150° C. in a constant temperature oven. The baked plaque was allowed to stand a minimum of 5 days under constant conditions of 23° C. and 50 percent relative humidity. Specimens were stamped from the plaque and used for the mechanical measurement of properties, results of which are listed in Table 5.

Extractions of two specimens from the baked product by water were carried out in Soxhlet extractors for 8.0 hours. The undissolved sample weight was determined by subtraction of the original thimble weight from the combined weight of the extracted sample and thimble after TABLE 4.—INFLUENCE OF BAKING TIME ON BOILING WATER EXTRACTION RESISTANCE AND HEAT STABILITY OF A POLY(ETHYLENE OXIDE)-POLY(ACRYLIC ACID) ASSOCIATION PRODUCT

| Baking time at 150° C., hours | Solution sample wt., grams | Contained polymer, grams | Baked film wt., grams | Baked film wt.×100÷contained polymer, weight percent | Reflux rate, cc. water per min. | Weight of dry undissolved portion film, grams | Undissolved film wt.×100÷baked film, weight percent |
|---|---|---|---|---|---|---|---|
| 0.5 | 3.4949 | 0.2371 | 0.2405 | 101.4 | 5.4 | 0.1509 | 62.7 |
| 1.5 | 5.3076 | 0.3601 | 0.3607 | 100.2 | 5.8 | 0.273 | 75.7 |
| 2.0 | 4.8438 | 0.3286 | 0.3286 | 100.0 | 4.5 | 0.2511 | 76.4 |
| 3.0 | 4.7243 | 0.3205 | 0.3182 | 99.3 | 3.3 | 0.2543 | 79.9 |
| 5.0 | 4.8202 | 0.3270 | 0.3231 | 98.8 | 4.1 | 0.2475 | 76.6 |
| 7.0 | 5.0065 | 0.3397 | 0.3312 | 97.5 | 6.3 | 0.2855 | 86.2 |
| 10.0 | 4.7834 | 0.3245 | 0.3138 | 96.7 | 4.8 | 0.2725 | 86.8 |

Example XV

The poly(ethylene oxide) used in this experiment contained 1 percent by weight of N,N,N',N'-tetrakis-(2-hydroxypropyl)ethylenediamine added as a stabilizer, and dried in a vacuum extruder. An aqueous solution was prepared by mixing 960 grams of the stabilized resin in the form of approximately 3/16 inch by 3/16 inch cylinders with 11,040 cubic centimeters of water for six days in a bottle rotated by can rolls at room temperature. The solids content of the solution was determined to be 7.95 percent by evaporating approximately 15-gram samples in triplicate in aluminum weighing cups in a constant temperature oven at 70° C., and drying the polymer at this temperature to constant weight. The reduced viscosity of the contained polymer as measured in a Ubbelohde viscometer was 6.43 in water at 30.0° C. at a concentration of 0.20 gram per 100 cubic centimeters of solution.

The solids content of the aqueous polyacrylic acid solution sample used for this experiment was determined to be 16.52 percent by evaporating approximately 3-gram samples in triplicate in aluminum weighing cups in a constant temperature oven at 150° C., and drying the polymer at this temperature to constant weight. The reduced viscosity of the contained polymer as measured in a Ubbelohde viscometer was 1.86 in water at 30.0° C. at a concentration of 0.20 gram per 100 cubic centimeters of solution. The equivalent weight of the polymer, determined by titration with standard sodium hydroxide, was 74.2; the theoretical equivalent weight is 72.06.

To 606 grams of the poly(acrylic acid) solution in a one-gallon glass jug was added 1243 grams of acetone which was dissolved and thoroughly mixed by rotation of the container on can rolls one hour. Addition of 1258 grams of the poly(ethylene oxide) solution followed by mixing overnight in the same manner, gave a clear, light-colored solution containing by calculation 3.22 percent of each of the two polymers and 40.0 percent acetone.

Evaporation and drying for 90 hours in a vacuum oven of 3000 grams of the solution distributed equally in four 14 inch by 16 inch by 2½ inch trays lined with "Teflon"-coated Fiberglas cloth gave 201 grams of flexible, clear, light-colored, resinous material. The oven vacuum was maintained at 29 inches of mercury, and the oven was heated by water at 50° C. which was continually circulated in channels provided for it in the shelf-design.

A 5¼ inch diameter plaque of 0.066 inch thickness was prepared from a portion of this material by molding at an approximate mold temperature of 150° C. and a pressure of 580 p.s.i. on the sample. A clear, brown specimen baking them to constant weight in a forced draft, constant temperature oven at 120° C. Calculated undissolved material was 97.9 percent and 95.7 percent based on the initial solids content of the samples which was determined independently to be 95.6 weight percent by heating samples to constant weight at 150° C. to 158° C.

Example XVI

A clear, viscous solution of the reacting polymers was prepared by mixing overnight in a bottle rotated by can rolls the following materials: 400 grams of the aqueous poly(ethylene oxide) solution described in Example XV, 2101 grams of the aqueous poly(acrylic acid) solution described in the same example, and 280.7 grams of ethylene glycol monoethyl ether. A portion of this solution weighing 595 grams, and calculated to contain 30 grams of solids, was allowed to dry for 10 days in a tray constructed of tin foil. After continued drying three more days in a vacuum oven which was maintained at a negative pressure of 29 inches of mercury and heated at 46° C. by water circulating in channels in the oven shelves, the resulting clear film weighing 28 grams was removed from the tin foil by amalgamation with mercury. A disc 5¼ inches in diameter and 65 mils thick was prepared by molding this resin at 150° C. for 30 minutes with 230 p.s.i. pressure on the sample. After baking the product 60 minutes at 150° C. in a forced draft oven, and allowing it to stand in a room a minimum of 5 days under constant conditions at 23 C. and 50 percent relative humidity, specimens were cut from the plaque and used for tests described in Table 5.

Example XVII

A sample of poly(ethylene oxide) was prepared and tested to determine its mechanical properties. A sample of diced poly(ethylene oxide), the same as described in Example XV, was formed into a 5¼ inch-diameter disc of 58 mils thickness by molding at 135° C. up to 100 p.s.i. and cooling immediately by circulation of water in the press. Samples for mechanical properties were stamped from the white, opaque, flexible disc after its exposure to constant room conditions of 23° C. and 50 percent relative humidity for 13 days.

Example XVIII

To 1339 grams of a 2.02 percent aqueous poly(ethylene oxide) solution having a reduced viscosity of 53.0 was added 181.0 grams of 14.8 percent aqueous poly(acrylic acid) solution and 1520 grams of acetone. The reduced viscosity of the poly(acrylic acid) was 1.9 in water at 30°

C. at the usual concentration. Agitation of the mixture in a one-gallon jug by rotation overnight gave a light tan, slightly hazy solution. A portion of this solution weighing 2600 grams was dried for 48 hours in a vacuum oven operated at a negative pressure of 29 inches of mercury and heated at 50° C. by circulating water at 68° C. in the shelf channels. The clear, tough, light tan product weighing 43.5 grams was used in the preparation of a 5¼-inch diameter disc of 50 to 60 mils thickness by molding in the usual manner at a pressure of 58 p.s.i. and temperature of 180° C. to 150° C. for 2.0 hours. The quality of the molded product was improved by returning it to the mold and rapidly heating to 180° C. at 1160 p.s.i., holding these conditions for five minutes, and immediately cooling. The light, amber colored, translucent plaque, after being exposed at least five days to constant conditions of 50 percent relative humidity and a temperature of 23° C., was submitted to tests resulting in the values listed in Table 5.

Example XIX

A polyether-polyacid product containing 50 percent poly(ethylene oxide) and 5 percent poly(acrylic acid) was prepared and tested for mechanical properties. The poly(ethylene oxide) was used as an aqueous 4.94 percent solution; its reduced viscosity in water at 30° C. was 13.1. The poly(acrylic acid), with reduced viscosity of 1.9, was used as a 16.52 percent aqueous solution. A clear, nearly colorless solution of the coreactants was prepared by adding 302.7 grams of the poly(acrylic acid) solution, and 1315 grams of acetone to 1012 grams of the poly(ethylene oxide) solution, and mixing by rotation of the container overnight. A portion of this solution weighing 1315 grams, and calculated to contain 50.0 grams of solids, was evaporated and dried during 94 hours in a vacuum oven which was maintained at a negative pressure of 29 inches of mercury and at a temperature of 50° C. The light tan, translucent flexible solid weighed 49.5 grams. A portion of this was molded into a 5¼ inch diameter disk of 50 to 60 mils thickness with a pressure of 580 p.s.i. on the sample, and a temperature of 180° C. for 10 minutes followed by an additional 110 minutes at 150° C. After allowing the product to stand a minimum of five days exposed under constant conditions of 23° C. and 50 percent relative humidity, specimens were cut from the tan, flexible plaque and used for tests described in Table 5.

Example XX

A clear viscous solution of the reacting polymers was prepared by mixing overnight in a one-gallon glass jug rotated by can rolls the following materials: 478.0 grams of the aqueous poly(ethylene oxide) solution described in Example XV, 380.0 grams of the aqueous poly(acrylic acid) solution described in the same example, and 858.0 grams of acetone. A portion of this solution weighing 858.0 grams, and calculated to contain 50.3 grams of solids, was evaporated and dried during 94 hours in a vacuum oven which was maintained at a negative pressure of 29 inches of mercury and heated by water at 78° C. circulating in channels in the oven shelves. The tan colored, clear product weighed 53 grams. A portion of this was molded into a 5¼ inch diameter disc of 63 mils thickness with a pressure of 580 p.s.i. on the sample at a temperature of 180° C. for 10 minutes. After baking the product 110 minutes at 150° C. in a forced draft oven, and allowing it to stand five days in a room under constant conditions of 23° C. and 50 percent relative humidity, specimens were cut from the transparent, light amber, tough flexible plaque and used for tests described in Table 5.

The unmolded portion of the dry 53 gram-product described above was stored a little more than 4 months in a closed container and used for solubility tests. The contained solids in this material were determined to be 93.3 percent by drying samples in triplicate to constant weight at 125° C. A sample of the material weighing 0.5594 gram was extracted for 48 hours by mixing at room temperature with 102 grams of solvent mixture containing 50 percent water and 50 percent acetone. The insoluble material was dried in a constant temperature oven at 150° C. to a constant weight of 0.0211 gram which represents 4.04 percent unextracted material based on the calculated contained solids weight of the sample of 0.5220 gram.

Twenty-four days later the solids content of the resin was checked and found to be 90.75 percent by the procedure described in the preceding paragraph. A sample weighing 0.5138 gram was dissolved during a 48-hour period by mixing with a solution containing 3.68 grams of 28 percent ammonia dissolved in 99 grams of water. Another sample weighing 0.6373 gram was completely dissolved during a 48-hour extraction at room temperature in a solution of 1.0 percent sodium hydroxide made up from 63.5 cc. of 0.5 N sodium hydroxide dissolved in 63.50 grams of water. A third sample of the material weighing 0.5235 gram was first baked two hours at 150° C. before the dry product, weighing 0.4879 gram, was extracted in a solvent mixture composed of 49 grams of acetone and 49 grams of water. The insoluble material remaining after extraction for 48 hours by mixing the sample with the solvent mixture at room temperature was separated by filtration on a 200-mesh screen, transferred to an aluminum weighing cup, and dried to a constant weight of 0.4682 gram after approximately 18 hours. This unextracted material represented 98.6 percent of the dry solids calculated to be in the original sample.

Example XXI

The polyether starting material was prepared by a reaction of polyethylene glycol with average molecular weight of about 6000 with hexamethylene diisocyanate. To 300 grams of the polyethylene glycol melted in a reaction flask and heated to a temperature of 130° C. was added with stirring 2.0 grams of monoethanolamine and 12.5 grams of the diisocyanate. Stirring and heating at 120° C. to 130° C. were continued for 45 minutes before the reaction mixture was cooled. The product was a light yellow, tough, resinous material with melting point of 58° C. to 59.5° C., and a reduced viscosity of 1.54 at 46° C. in a mixed solvent containing 3 parts of phenol and 2 parts of symmetrical tetrachloroethane by weight.

The aqueous poly(acrylic acid) solution used in this experiment contained 17.16 percent solids; its reduced viscosity was 1.9 at 30° C. in water. When 5 cubic centimeters of this solution was mixed in a test tube with 5 cubic centimeters of a solution prepared by dissolving 3.0 grams of the previously described modified polyether in 57.0 grams of water a precipitate immediately formed.

A hazy solution was obtained by adding consecutively 10.0 grams of the poly(acrylic acid) solution, 34.32 grams of the modified polyether solution, and 18.99 grams of acetone, and mixing by rotation in a bottle at room temperature for 15 minutes. The solids content of the solution was determined to be 5.23 percent. A sample of this solution weighing 5.2217 grams was transferred to an aluminum weighing cup and allowed to form an air-dried film by standing open to the room overnight. After baking for two hours at 150° C., the film weight was 0.2040 gram. While still attached to the aluminum weighing cup, the film was extracted for 8.0 hours with boiling water in a Soxhlet extractor. The weighing cup was first divided into two parts and reshaped so that it could be fitted into the extraction thimble. After completion of the extraction, the sample, its aluminum support and its thimble were dried to a constant total weight of 73.8055 grams during approximately 18 hours at 100° C. The undissolved sample weight was determined to be 0.1786 gram by substraction of the original cup weight (1.3153 grams) and thimble weight (72.3116 grams) from the total weight. This insoluble material is equivalent to 87.5 percent of the original baked film weight.

Example XXII

In this experiment the polyether and polyacid reactants were caused to react without the use of solvents by molding them as a mixed powder. The polyether was a polyethylene gylcol having an average molecular weight of about 20,000. The polyether was micropulverized to form a powder and this had a reduced visosity in water of 0.45 at 30° C.

A solution of poly(acrylic acid) having a reduced viscosity in water at 30° C. of 1.9 was tray-dried at 65° C. under a reduced pressure of 24 inches of mercury to form a colorless glass. This was broken up in a mortar, and ground with ½ inch steel balls in porcelain, one-quarter ball mills. The poly(acrylic acid) passing a 60-mesh screen had a moisture content of 6.4 percent determined by drying samples to constant weight at 150° C., and had a reduced viscosity in water (in which it dissolved with difficulty) of about 1.0 at 30° C.

Fifty grams of the plyether, having passed a 60-mesh screen, was mixed 3.0 hours with 53.4 grams of the screened poly(acrylic acid) by rolling the white powder together in a 16-oz. wide mouth bottle on can rolls. A 5¼ inch diameter plaque of 66 mils thickness was prepared by molding a sample of this mixture of powders at 180° C. for 30 minutes. The plaque, after being cooled, was removed from the mold and then baked in a constant temperature oven at 150° C. for 90 minutes to give a product which, after cooling to room temperature, was quite clear, light amber, and flexible. After it was allowed to stand a minimum of 5 days under constant conditions of 23° C. and 50 percent relative humidity, specimens were stamped from the plaque and used for mechanical property measurements, results of which are listed in Table 5.

Extraction of two specimens from the baked product by water were carried out in Soxhlet extractors for 8.0 hours. Calculated undissolved material was 96.0 percent and 94.8 percent respectively for the two samples.

Example XXIII

The polyether reactant in this case was prepared by simultaneously reacting a mixture containing 75 percent by weight of ethylene oxide and 25 percent propylene oxide. The polyether sample had a reduced viscosity in water at 30° C. of 0.23.

Addition of 169.0 grams of 14.8 percent aqueous poly(acrylic acid), 100.0 grams of water and 80.0 grams of acetone to 25.0 grams of the previously described polyether contained in a one-quart bottle followed by shaking the mixture gave a white, amorphous precipitate. Further addition of 100.0 grams of acetone followed by mixing overnight gave a clear solution. Drying of 454 grams of this solution for 96 hours in a vacuum oven heated at 50° C. by water circulating at a temperature of 68° C. through shelf channels and operated at a negative pressure of 29 inches of mercury produced a very flexible, tough, translucent resinous material weighing 47.5 grams. A 5¼-inch diameter plaque with thickness of 50 to 60 mils was formed from this material by molding for 2.0 hours with a presssure of 580 p.s.i. on the sample and a temperature 180° C. to 150° C. The very flexible, nearly clear, tan colored product, after being exposed in a room at constant conditions of 23° C. and 50 percent relative humidity for five days was used for tests described in Table 5.

Example XXIV

Poly(vinyl methyl ether) having a reduced visocity in water at 30° C. or 0.25 was used in this experiment as an equeous 44.0 percent solution. The poly(acrylic acid) was an aqueous 14.8 percent solution and had a reduced viscosity of 1.9. Addition of 253.0 grams of the poly(acrylic acid) solution and 100 grams of acetone to 28.0 grams of the poly(vinyl methyl ether) solution followed by shaking produced a small precipitate. Further addition of 71.0 grams of acetone and shaking caused the precipitate to disapear and produced a slightly hazy solution. A portion of this solution weighing 435.0 grams and contained in a tray lined with "Teflon"-coated Fiberglass cloth was dried for 96 hours in a hot water-heated vacuum oven operated at a temperature of 50° C. and negative pressure of 20 inches to 29 inches of mercury. The dried product, weighing 51.0 grams, was very hard, brittle and amber colored. The dark brown, brittle, opaque plaque prepared by molding this material for 2.0 hours with a temperature of 180° C. for the first 10 minutes and 150° C. for the remaining 110 minutes and at a pressure of 580 p.s.i. was too brittle for measurement of the usual properties determined for plaques with the exception of hardness values and Soxhlet extraction vaues which are included in Table 5.

Example XXV

Dissolution of 280 grams of poly(methacrylic acid) powder, which had been passed through a 60-mesh screen, in 3220 grams of distilled water took place during a 7-day period while the mixture was rotated in a one-gallon wide mouth jar on can rolls to form a clear, colorless solution. Testing of the solution showed a total solids content of 7.11 percent determined at 150° C., an equivalent weight for the polymer of 94.8 (theoretical value 86.1) determined by titration with 0.1 N sodium hydroxide using phenolphthalein indicator, and a Ubbelohde reduced viscosity for the polymer of 1.90 (30° C., water).

To 352.0 grams of this solution heated to a temperature of 60° C. in a 2-liter round-bottom flask was added 184.0 grams of water. The solution was mixed by stirring with a small stirrer rotated by an air-powered motor, and heating was continued with an electric heating mantle controlled by a variable voltage transformer. When the temperature reached 93° C., addition was started of 315.0 grams of poly(ethylene oxide) aqueous solution the same as described in Example XV. Stirring was continued and the temperature was maintained in the range of 85° C. to 91° C. during the 10-minute addition period. Precipitation, which started almost immediately with the poly(ethylene oxide) addition, gave white amorphous lumps which were filtered while still hot onto a filter paper in a Buchner funnel.

The wet precipitate, weighing 140.0 grams, was washed with 1111 grams of water on the filter, and dried for two weeks on "Teflon"-coated Fiberglas cloth in an electrically heated vacuum oven at 50° C. and absolute pressure of 1 mm. The product, weighing 50.49 grams was hard, brittle, opaque, and nearly white in color. After drying the product 10 days longer under the same conditions, its weight was 50.43 grams.

A sample of the product weighing 7.520 grams was dissolved by shaking it overnight with 50.0 cubic centimeters of 0.500 N sodium hydroxide in a 250 milliliter Erlenmeyer flask. Phenolphthalein indicator was added and 154.6 cubic centimeters of 0.1002 N hydrochloric acid was needed to neutralize the solution. From the known equivalent weight of the poly(methacrylic acid) starting material, a total of 25.92 grams of poly(methacrylic acid) is accounted for in the product by this analysis.

The solids contained in the filtrate were determined by drying three samples of approximately 30.0 grams each in aluminum weighing cups to constant weight in a constant temperature oven at 125° C. The result of 0.12 percent solids represented a weight of 0.82 gram solids in the total filtrate of 680.5 grams. The acidity of the filtrate was determined by titrating a sample weighing 93.9527 grams with 0.100 N sodium hydroxide using phenolphthalein indicator. The titration requirement of 1.40 cubic centimeters corresponded to a total of 0.0010 equivalent of poly(methacrylic acid) in the filtrate.

Example XXVI

A sample of powdered poly(methacrylic acid) from the same batch described at the beginning of Example XXV was dried overnight at 50° C. in an electrically heated vacuum oven at an absolute pressure of 1 millimeter. Dissolution of 1.92 grams of the dry powder took place in 100.0 grams of ethylene glycol monomethyl ether by warming the mixture in a 16-oz. bottle on a steam bath. Mixing of this solution with a second solution containing 1.92 grams of poly(tetramethylene oxide) of reduced viscosity 0.36 (30° C., acetone) dissolved in 50.0 grams of acetone gave a colorless solution calculated to contain 2.50 percent of the combined polymers.

A colorless, white brittle film was obtained by air-drying for 10 days 20.43 grams of the above solution in a 4-oz. bottle. After baking this film for two hours at 150° C., the 0.4904 gram film was extracted for 48 hours by rotation in the 4-oz. bottle with 98.0 grams of a mixed solvent containing 66 percent ethylene glycol monomethyl ether and 33 percent acetone. The remaining undissolved material was transferred to a weighing cup and dried to a constant weight of 0.0216 gram during approximately 18 hours at a temperature of 150° C. This unextracted, dried material was equivalent to 4.2 percent of the total polymer weight of 0.5108 gram calculated to be in the original solution sample.

A nearly identical film was obtained by air-drying for 10 days 21.69 grams of the polyacid- and polyether-containing solution. Since the combined polymer content was 0.5421 gram, the air-dried film weight of 0.5815 gram indicated a volatile content of 6.8 percent. Extraction by the same procedure applied to the preceding film, using 116.0 grams of mixed solvent containing 66 percent ethylene glycol monomethyl ether and 33 percent acetone, resulted in 4.4 percent (0.0240 gram) of undissolved material.

Example XXVII

The polyhydroxyethylated poly(vinyl alcohol) in this experiment was used as a 38.3 percent solution in acetonitrile. Its specific viscosity was about 0.12 in acetonitrile for a solution containing 0.20 gram of polymer per 100 milliliters solution at 20° C. The degree of hydroxyethylation was equivalent to about 10 moles of ethylene oxide per hydroxyl group of the original polymeric alcohol. The poly(acrylic acid) had a reduced viscosity of 1.40 in water at 30° C. and was used as a 28.3 percent aqueous solution.

Addition of 30.0 grams of water to a clear solution obtained by mixing 20.0 grams of the poly(acrylic acid) solution with 19.84 grams of the hydroxyethylated poly(vinyl alcohol) solution, followed by mixing by rotation for 3 hours produced a slightly hazy, rather viscous stock solution. Three flexible films were obtained from the stock solution by transferring solution samples weighing a little more than 1 gram each to aluminum weighing cups, air-drying overnight, and baking in a constant temperature oven at 100° C. for 15 minutes. These films, while still attached to the aluminum cups, were extracted for 8.0 hours with boiling water in Soxhlet extractors. The weighing cups were first divided into two parts and reshaped in order to be fitted into the extraction thimbles. Upon completion of the extractions, the samples, while still adhering to the aluminum cups and contained in their respective thimbles, were dried to constant weight at 100° C. during approximately 18 hours. The undissolved sample weights were determined by subtraction of the combined weight of the weighing cup and thimble from the total of extracted sample, weighing cup and thimble. Results are summarized as follows:

| Solution Sample, wt., g. | Contained polymer, g. | Film Weight, g. | Unextractable portion based on contained solids, wt. percent |
|---|---|---|---|
| 1.1342 | 0.2154 | 0.2248 | 73.0 |
| 1.1485 | 0.2181 | 0.2261 | 72.5 |
| 1.2540 | 0.2381 | 0.2480 | 70.0 |

Example XXVIII

A copolymer of styrene and maleic acid is demonstrated in this experiment to associate at room temperature with poly(ethylene oxide) to form a water-insoluble product. The styrene-maleic acid copolymer was formed as follows: Copolymerization in an autoclave equipped with a stirrer and condenser of 1600 lbs. of styrene and 1500 lbs. of maleic anhydride dissolved in 9800 lbs. of acetone, catalyzed by 15 lbs. of dibenzoyl peroxide took place at atmospheric pressure during a reaction time of 40 hours and a temperature of approximately 50° C. The product solution which contained 22.9 percent solids was diluted with 11,500 lbs. of acetone and then divided into 3 equal parts of 1150 gallons each. The first batch was brought near to the point of precipitation by dilution with 235 gallons of an isopropanol-water C.B.M. mixture and 45 gallons of water. Rapid addition of additional water amounting to 1440 gallons resulted in the formation of a white precipitate having good grain which was separated by centrifugation in a Bird solid bowl continuous centrifuge to give a product with solids content of 46 percent. Drying in a rotary vacuum dryer at approximately 50° C. for 32 hours gave a final white granular product of 96.5 percent solids, weighing 820 lbs. The specific viscosity of the product using 0.4 gram in 100 milliliters of isophrone at 20° C. was 0.58. Product recovery from the remaining two solution batches of 1150 gallons each was performed in the same way.

To 2010 lbs. of this maleic anhydride-styrene copolymer slurried by agitation with 6000 lbs. of isopropanol-water C.B.M. mitxure in an autoclave was added 506 lbs. of reagent grade sodium hydroxide. After continued agitation for four hours with a maximum temperature of 65° C., a 50 gram sample of filter cake obtained from the slurry when tested by dissolution in 150 cubic centimeters of water formed a clear solution. The recovery steps consisted of filtration on a rotary vacuum filter, and drying in a rotary drier at 70° C. and a negative pressure of 27 inches of mercury until a solids conent of at least 95 percent was obtained. Of the total potential carboxyl groups in the copolymeric product, 60 to 75 percent were estimated to have reacted with sodium hydroxide to form salts.

To a solution formed by dissolving 13.6 grams of 38 percent hydrochloric acid in 500 grams of water was added a second solution containing 25.0 grams of the previously described partially neutralized styrene-maleic acid copolymer and 9.13 grams of poly(ethylene oxide) dissolved in 500 grams of water. The poly(ethylene oxide) had a reduced viscosity of 2.0 in acetonitrile at 30° C. The white precipitate which resulted almost immediately from combining and mixing the solutions, was separated from the supernatant liquid by decantation. Solid residues resulting from drying separately the mother liquor and precipitate in an oven at 100° C. for four days weighed 7.64 grams and 26.52 grams respectively. These residues, in the same order, consisted largely of sodium chloride and a resinous product. The product was estimated to represent 86 percent of the calculated combined weight of poly(ethylene oxide) and styrene-maleic acid copolymer originally charged.

Example XXIX

A viscous hazy solution made up from 252.0 grams of aqueous 9.93 percent poly(acrylic acid), 312.0 grams of aqueous 8.01 percent poly(ethylene oxide), 1.0 gram of monoethanolamine, and 32.0 grams of water was clarified by the addition of 0.20 gram additional monoethanolamine followed by mixing for one hour. The poly(acrylic acid) solution was the same as that used in Example XV. The poly(ethylene oxide) had a reduced viscosity of 5.0 in water at 30° C. and the solution contained 8.01 percent by weight of poly(ethylene oxide). The calculated polymer weights in the solution were 25.02 grams of poly(acrylic acid) and 24.99 grams of poly(ethylene oxide). The observed pH of the solution was 3.77.

A film prepared by air-drying 6.4762 grams of this solution for seven days in a 4-oz. bottle weighed 0.5780 gram, was clear, very flexible, soft, and light amber colored. The film completely dissolved at room temperature when mixed with 116.0 grams of water during a 48-hour period.

A nearly identical film prepared by air-drying 6.7405 grams of the same solution for 7 days was baked for 20 minutes at 150° C. in a constant temperature oven. The resulting film weighing 0.5785 gram represented 102.5 percent of the 0.5644 gram of solids calculated to be in the original solution sample. Extraction of this sample by water was carried out by adding 116.0 grams of water to the sample in the 4-oz. bottle and rotating the bottle for 48 hours. The remaining insoluble gel was filtered on a 200-mesh screen, transferred to an aluminum weighing cup, and dried in about 18 hours to constant weight in a forced draft constant temperature oven at 125° C. The dry unextracted material weighing 0.4341 gram represented 76.9 percent of the contained solids in the original sample.

Example XXX

A solution containing a small white precipitate was made up by mixing together 126.0 grams of aqueous 9.93 percent poly(acrylic acid) (reduced viscosity 1.9), 10.0 cc. of 1.0 N sodium hydroxide solution, and 156.0 grams of aqueous 8.01 percent poly(ethylene oxide) solution (reduced viscosity 5.03). Addition of 1.0 cc. additional sodium hydroxide solution followed by mixing produced a clear, viscous, light amber solution. This solution was calculated to contain 12.50 grams of poly(acrylic acid) and 12.50 grams of poly(ethylene oxide).

A film prepared by air-drying 6.2349 grams of this solution for four days in a 4-oz. bottle weighed 0.5572 gram and was clear, soft and flexible, and light amber colored. The film completely dissolved at room temperature when mixed with 111.0 grams of water during a 48-hour period.

A nearly identical film prepared by air-drying 6.3553 grams of the same solution for four days was baked for 20 minutes at 175° C. in a constant temperature oven. The resulting film, weighing 0.5395 gram, represented 99.6 percent of the 0.5417 gram of total polymer calculated to be in the original solution sample. Extraction of this sample was carried out by adding 108 grams of water which were rotated with the sample for 48 hours. The remaining insoluble gel was filtered on a 200-mesh screen, transferred to an aluminum weighing cup, and dried during about 18 hours to constant weight in a constant temperature oven at 125° C. The dry unextracted material, weighing 0.4591 gram represented 84.8 percent of the contained solids in the original sample.

Example XXXI

The polyacid used in this experiment was obtained by copolymerization of 65 grams of maleic acid with 65 grams of acrylic acid catalyzed by 2.6 grams of acetyl peroxide in 520 grams of dry acetone at a temperature of 55° C. for 96 hours. The white product was purified by dissolving in methanol, followed by precipitation and washing in ethyl ether. Dissolution of 40 grams of the copolymer in 200 grams of water produced a clear, colorless, slightly viscous solution, the reduced viscosity of which was determined to be 0.92 for a sample diluted to a concentration of 0.200 gram per 100 ml. of solution. Solids content of 15.6 percent was determined by drying triplicate samples of the solution to constant weight at 150° C. during a period of approximately 18 hours. Some precipitation occurred when 161 grams of the copolymer acid aqueous solution were combined with 382 grams of an aqueous solution containing 8.06 percent poly(ethylene oxide) having a reduced viscosity of 6.4. Addition of 214 grams of acetone followed by continued agitation on can rolls for 18.5 hours formed a clear, viscous solution. A portion of this solution weighing 609 grams contained in a "Teflon"-coated "Fiberglas" lined tray was air dried for 9 days, and further dried in an electrically heated vacuum oven for 16 hours at 50° C. and an absolute pressure of 8 mm. The resulting clear, colorless, very flexible solid weighed 41 grams. A portion of this product was molded into a 5¼ inch diameter disc of 50 to 60 mils thickness with a pressure of 580 p.s.i. on the sample, and a temperature of 180° C. for 10 minutes followed by 150° C. for an additional 110 minutes. The clear, flexible, nearly colorless molded product after being exposed a minimum of five days to constant conditions of 23° C. and 50 percent relative humidity was observed to have the properties shown in Table 5.

A product sample remaining from the physical property tests and weighing 0.6081 gram after agitation with 122 grams of water by rotation on can rolls for 48 hours weighed 0.9841 gram. The swollen sample increased to a maximum weight of 1.303 grams upon standing with about

TABLE 5.—PHYSICAL PROPERTIES OF POLYETHER-POLYACID PRODUCTS

| Composition* | Example | | | | | | | | | | | |
|---|---|---|---|---|---|---|---|---|---|---|---|---|
| | XXII | II | XXII | XVII | XV | XIX | XX | VIII | XVIII | XXIII | XXIV | XXXI |
| Polyether | (1) | (2) | (2) | (2) | (2) | (2) | (2) | (2) | (2) | (3) | (4) | (2) |
| Weight percent | 50 | 50 | 90 | 100 | 50 | 50 | 38 | 5 | 50 | 50 | 25 | 54.4 |
| Reduced viscosity, (30° C., water) | 0.45 | 4.3 | 6.4 | 6.4 | 6.4 | 13.1 | 6.4 | 6.4 | 53.0 | 0.23 | 0.24 | 6.4 |
| Polyacid | (5) | (5) | (5) | None | (5) | (5) | (5) | (5) | (5) | (5) | (5) | (6) |
| Weight percent | 50 | 50 | 10 | | 50 | 50 | 62 | 95 | 50 | 50 | 75 | 45.6 |
| Reduced viscosity, (30° C., water) | 1.0 | 0.2 | 1.9 | | 1.9 | 1.9 | 1.9 | 1.9 | 1.9 | 1.9 | 1.9 | 0.92 |
| Molding & baking conditions: | | | | | | | | | | | | |
| Molding time, minutes | 30 | None | 30 | <1 | 10 | 10+110 | 10 | 10+110 | 125 | 10+110 | 10+110 | 10+110 |
| Molding temperature, °C | 180 | | 150 | 135 | 150 | 180–150 | 180 | 180–150 | 180–150 | 180–150 | 180–150 | 180–150 |
| Baking time, minutes | 90 | | 60 | None | 110 | None | 110 | None | None | | | |
| Baking temperature, °C | 150 | | 150 | | 150 | | 150 | | | | | |
| Properties: | | | | | | | | | | | | |
| Tensile strength, p.s.i | 400 | | 1,600 | 1,642 | 925 | 2,162 | 3,480 | | 3,000 | 900 | | 1,892 |
| Elongation, percent | 315 | | 10 | 70 | 291 | 385 | 15 | | 155 | 465 | | 610 |
| Load at 100% elongation, p.s.i | 125 | | | | 240 | 390 | | | 2,350 | 90 | | 175 |
| ASTM stiffness modulus, p.s.i | 291 | | 25,040 | 55,380 | 459 | 461 | 52,500 | | 21,900 | 229 | | 367 |
| $T_f$, ° C | −8 | | −10 | −36 | −5 | −2 | +19 | | +4 | −7 | | −3 |
| $T_4$, ° C | +4.5 | | +36.5 | +50 | +7 | +12 | +36 | | +30 | +4 | | +11 |
| Brittle temperature, ° C | 0 | | | −50 | −4 | 0 | +30 | | −4 | +4 | | −2 |
| Shore hardness D | 14 | | 53 | 52 | 18 | 20 | 77 | 93 | 55 | 10 | 91 | |
| Shore hardness A | | | | | | 55 | 62 | 97 | | 96 | 37 | 100 | 47 |
| Heat distortion, ° C | | | | | | | | 70 | | | | |
| Izod impact, ft.-lbs | | | | | | | | 0.2 | | | | |
| Volatiles, percent | 5.2 | (7) | 3.4 | 6.6 | 4.44 | | 2.3 { 3.2 / 3.0 } | | 5.3 | 5.0 | 2.9 | |
| Soxhlet extraction test, undissolved sample remaining based on corrected sample weight (percent), duplicate samples. | 96.0 / 94.8 | 60.9 / 58.9 | 22.1 / 22.3 | 2.8 | 95.7 / 95.7 | | 96.2 / 95.8 | | 91.9 / 91.9 | 90.1 / 91.3 | 63.1 / 65.4 | |
| Room temperature extraction test, undissolved sample remaining based on corrected sample weight (percent), duplicate samples. | | | | | | | | 43.9 / 2.1 | | | | 89.8 |

[1] See Exp. XXII.
[2] Poly(ethylene oxide).
[3] Ethylene oxide-propylene oxide copolymer.
[4] Poly(vinyl methyl ether).
[5] Poly(acrylic acid).
[6] Copolymer of maleic and acrylic acid.
[7] Water-sample mix.

10 cc. of fresh water for four additional days. Drying of the sample to constant weight at 150° C. during 18 hours gave 0.4759 gram of undissolved material. Moisture content of the humidified sample was determined to be 12.89 percent by drying duplicate specimens of the material to constant weight at 150° C. during approximately 18 hours. The insoluble material is therefore 89.8 percent on a dry weight basis.

In Table 5, above, are listed the physical properties of some of the products shown in the preceding examples. The data contained therein were obtained as follows: Tensile strength, elongation, and load at 100 percent elongation were determined in a "Scott" tensile tester; Stiffness and Shore hardness tests were carried out according to ASTM methods D–747–50 and D–676–49T, respectively; $T_F$ and $T_4$ are the points corresponding to 135,000 and 10,000 pounds per square inch, respectively, on a stiffness-temperature curve obtained in accordance with the procedure set forth in ASTM method D–1043–51; Brittle temperature was determined according to ASTM method D–746–52T; Heat distortion tests were carried out according to ASTM method D–648–45T; and the Izod impact tests were carried out according to ASTM method D–256–54T.

Example XXXII

In this experiment poly(acrylic acid) was reacted with hydroxyethylated phosphoric acid. The adduct was prepared by reaction of syrupy phosphoric acid with 11.9 moles of ethylene oxide per mole of phosphoric acid. A gram of the material was equivalent to 0.1 cc. of normal base when titrated with sodium hydroxide, and its phosphorus content was such that 639 grams contained 1 gram atom of phosphorus. Physical properties follow: $n$ 30/D, 1.4658; specific gravity, 25/15° C., 1.205.

A solution formed by dissolving 5 grams of the hydroxyethylated phosphoric acid in 25 grams of 28 percent aqueous poly(acrylic acid) was baked on a glass slide at 150° C. in a forced draft oven to form a light brown, transparent, brittle residue which could be removed quite easily from the glass. A sample of the baked residue weighing 1.0 gram gained only 0.45 gram in weight when mixed with 100 grams of water by rolling for 24 hours. The original weight of 1.0 gram was recovered when the swollen sample was separated from the aqueous phase and dried for three hours in a forced draft oven at 100° C. Another sample of the baked product was observed to be completely soluble in 5 percent aqueous sodium hydroxide solution.

Example XXXIII

The reaction product of this experiment, prepared from the originally water-soluble poly(ethylene oxide) and an equal part of acrylic acid-vinyl alcohol copolymer, is nearly as water insoluble as is the unmodified acrylic acid-vinyl alcohol copolymer. The copolymer was prepared by hydrolysis of an acrylonitrile-vinyl acetate copolymer precursor with approximately twice its weight of sodium hydroxide in aqueous alcoholic suspension. The copolymer contained about 70 mole percent sodium acrylate and 30 mole percent vinyl alcohol which corresponds to 1.1 carboxyl groups per 100 molecular weight in the acidified polymer. There was 1 percent residual nitrogen present. A total solids determination on the resin carried out at 125° C. indicated the presence of 8.0 percent moisture.

Attempted dissolution of 4.00 grams of this resin in 396 grams of distilled water by rolling overnight produced a mass of gelatinous material. Vigorous agitation for 30 minutes in an Osterizer produced a substantially clear solution free of gel. The solids content of the solution as determined by triplicate samples dried at 150° C. was 0.968 percent. The viscosity of this solution at 25° C. as determined by a Brookfield Model LV viscometer at 6 r.p.m. and using a No. 2 spindle was 579 centipoises.

The poly(ethylene oxide) was prepared by solution polymerization in toluene from ethylene oxide monomer, and its reduced viscosity in water at 30° C. was 6.43 at a concentration of 0.208 gram per 100 cc. of solution. Dissolution of 960 grams of the poly(ethylene oxide) in 11,040 cc. of water by prolonged rolling gave a viscous solution with solids content of 7.95 percent as determined by drying triplicate samples to constant weight at 70° C. during approximately 20 hours.

In an 8 oz. bottle were mixed 100.0 grams of the copolymer solution, 12.18 grams of the poly(ethylene oxide) solution, and 10.00 cc. of 1.0 normal sulfuric acid. The solution after rolling overnight contained some precipitate and had a pH of 2.20. Upon drying this mixture in an evaporating dish placed in a desiccator under vacuum for three days there was formed a light tan, substantially clear, flexible film weighing 1.75 grams and an additional 0.41 gram of white powdery material. Soxhlet extraction of samples of the product film with boiling water for eight hours showed 52.6 percent water insolubility.

A sample of the hydrolyzed copolymer solution (0.968 percent solids) weighing 100.0 grams was acidified with 10.00 cc. of 1.0 normal sulfuric acid to form a solution with a pH of 2.30. Evaporation of this solution in an evaporating dish placed in a desiccator under vacuum for three days yielded 1.24 grams of a white residual solid. Soxhlet extraction results for this material and the previously described association product as determined by duplicate samples are summarized in the following table:

| Material | Baking Time | Sample wt., g. | Reflux rate, cc. water/min. | Weight of dry undiss. portion, g. | Undissolved sample wt.×100÷original sample wt. percent |
|---|---|---|---|---|---|
| Reaction Product | None | 0.3048 | 4.9 | 0.1379 | 45.24 |
|  | None | 0.2733 | 5.0 | 0.1169 | 42.77 |
| Avg |  |  |  |  | 44.00 |
| Acrylic acid-vinyl alcohol copolymer | None | 0.2801 | 5.0 | 0.1582 | 56.48 |
|  | None | 0.3876 | 5.1 | 0.1892 | 48.81 |
| Avg |  |  |  |  | 52.64 |

Example XXXIV

A mobile gelatinous precipitate was formed when a methanolic 10 percent solution of poly(vinyl ethyl ether) was mixed in a test tube with an equal volume of methanolic 10 percent poly(acrylic acid) solution. The gel had a refractive index quite close to that of the solution phase. Addition of acetone equal to 30 to 40 percent of the final total volume dissipated some of the gel, but did not completely eliminate it.

The reduced viscosity of the poly(vinyl ethyl ether) used in this experiment was 4.2 in benzene at 20° C. at a concentration of 0.1 gram per 100 cc. of solution. Poly(vinyl ethyl ether) contains 1.4 ether groups per 100 molecular weight. The reduced viscosity of the poly(acrylic acid) was 1.88 in water at 30° C. at a concentration of 0.2 gram per 100 cc. of solution. The equivalent weight of the poly(acrylic acid) was 74.2.

Combining and mixing 7.50 grams of a 10.0 percent acetone solution of the poly(vinyl ethyl ether) with 7.50 grams of methanolic 10 percent solution of poly(acrylic acid) produced an abundance of gel particles. Addition and mixing of 13.0 grams of acetone with this mixture resulted in a precipitate which disappeared in a few minutes except for a few small flocs. A film formed by air-drying a portion of the above solution on a glass slide for two hours exhibited good adhesion and was hazy to normal observation, although only slightly hazy by transmitted light. Baking the film for one hour at 150° C. increased the haziness slightly, and also increased the adhesion. Soaking the sample in water for 24 hours resulted in loss of adhesion, and the sample swelled considerably.

Example XXXV

Substantial head stability and water insolubilization resulted from reacting poly(ethylene oxide) with a beta-carboxyethyl silicone polymer in this experiment. The silicone [1] is approximated by the formula $$(HOOCCH_2CH_2SiO_{3/2})$$

This highly branched polymer was observed to have a reduced viscosity of 0.08 at 30° C. in 90 percent ethanol solution using a concentration of 0.200 gram per 100 cc. of solution. The polymer was further characterized by a silicone analysis of 19.8 percent and neutralization equivalent of 115; the corresponding theoretical values are 22.4 and 125. The neutralization equivalent indicates the presence of 0.87 carboxyl groups per 100 molecular weight. The silicone polymer was combined in solution with an equal weight of poly(ethylene oxide) which had been characterized by having a reduced viscosity in water at 30° C. of 4.63 at a concentration of 0.050 gram of polymer per 100 cc. of solution. To prepare this solution, 18.00 grams of poly(ethylene oxide) and 18.00 grams of the silicone resin were dissolved in 238.0 grams of anhydrous ethyl alcohol to which had been added 26.00 grams of distilled water.

Two samples of this solution were transferred to 4-oz. bottles for testing the heat stability and water extraction of the dried samples. The products were first thoroughly dried by heating for 18 hours at 100° C. in a constant temperature forced draft oven. Heat stability for these duplicate samples was determined by determining their loss in weight during heating at 150° C. for an additional 18 hours. The same baked samples were extracted with water for 24 hours at room temperature, and the undissolved portions were separated and dried to constant weight at 150° C. during 18 hours. The amounts of water were 107.4 grams and 101.7 grams, respectively; agitation was provided by rotation of the containers on can rolls. Details are summarized as follows:

| Solution sample weight, grams | Calculated contained polymer, grams | Baked (100° C.) film weight grams | Weight Loss upon baking at 150 C. for additional 18 hrs., percent | Unextracted portion based on dried solids weight, percent |
|---|---|---|---|---|
| 5.6695 | 0.6805 | 0.6592 | 18.6 | 69.4 |
| 5.4054 | 0.6480 | 0.6292 | 19.2 | 70.8 |

Additional solutions were prepared for preparing films on glass. A clear, colorless solution of the silicone polymer was obtained by dissolving 30 grams of the resin in 270.0 grams of 90 percent ethanol. A portion of this solution weighing 16.0 grams was combined with 20.0 grams of a 6.0 percent aqueous solution of the poly(ethylene oxide) and 308.0 grams of anhydrous ethanol and throughly mixed to form a substantially clear and colorless solution. Calculation gave 43 percent of poly(ethylene oxide) and 57 percent silicone polymer based on contains solids. The poly(ethylene oxide)-silicone polymer product film, prepared by drying a portion of the combined solutions in a crystallizing dish at 150° C. for 60 minutes, was usefully flexible, colorless, and had good clarity. Only slight darkening to a light tan color took place upon heating a specimen at 300° C. for five minutes. A control film prepared from the aqueous ethanolic solution of the carboxyethyl silicone when baked for 60 minutes at 150° C. was observed to have less favorable flexibility, tensile, and adhesion to glass than did the poly(ethylene oxide)-silicone product resin.

Example XXXVI

In the example poly(ethylene oxide) is reacted with a styrene-acrylic acid copolymer prepared from equal parts by weight of the two monomers, and having an acid number of 365 mg. of potassium hydroxide per gram of sample which corresponds to 0.65 carboxyl groups per 100 molecular weight. The poly(ethylene oxide) to be reacted with the copolymer acid had a reduced viscosity in water at 30° C. of 4.63 at a concentration of 0.05 gram of polymer per 100 cc. of solution. Poly(ethylene oxide) weighing 155.0 grams was dissolved in 2,936 grams of trichloroethylene by mixing the materials in a one-gallon jug on rolls for 43 hours. Ten grams of the white, granular, hard, acrylic acid copolymer was dissolved in 90.0 grams of ethylene glycol monoethyl ether to from a 10.0 percent solution. This was combined with 200.0 grams of the 5.0 percent poly(ethylene oxide) solution to give a slightly viscous, and hazy solution containing equal parts by weight of the two polymers. Casting a 40 mil wet film of this solution on a glass slide and allowing it to dry of five days gave a tack-free, rather soft and hazy, white film having fair adhesion to glass. After baking for 30 minutes at 150° C. and allowing the film to cool, it became clear, colorless, and very tacky. It exhibited a quick grip bond formation when pressed against paper. This unexpected pressure sensitive adhesion property found in the baked film was sufficiently strong to have practical utility. Complete dissolution was accomplished when 0.500 gram of the baked material was agitated with 100 grams of a solvent mixture containing 31 percent by weight of ethylene glycol monoethyl ether and 69 percent trichloroethylene for 24 hours.

Example XXXVII

In the following experiment a pressure sensitive adhesive composition is prepared from equal parts by weight of poly(ethylene oxide) and an acrylic acid-styrene copolymer. The reduced viscosity of the poly(ethylene oxide) was 3.7 at 20° C. at a concentration of 0.20 gram per 100 cc. in acetonitrile. The reduced viscosity of the acrylic acid-styrene copolymer was 3.47 at 30.9° C. at a concentration of 0.20 gram per 100 cc. in dimethylformamide. The copolymer, which had been prepared from a mixture of monomers in a weight ratio of 30 parts of acrylic acid to 70 parts of styrene, had an acid number of 224 mg. of potassium hydroxide per gram of sample which corresponds to 0.40 carboxyl groups per 100 molecular weight. A viscous, somewhat hazy solution was prepared by combining 30.0 grams of the poly(ethylene oxide) and 30.0 grams of the acrylic acid-styrene copolymer with 1040.0 grams of the ethylene glycol monomethyl ether, heating the mixture at 100° C. and simultaneously stirring at a medium rate for 3.5 hours.

A portion of this solution when cast on a glass slide and baked 30 minutes at 150° C. gave a clear, light tan, sticky film which adhered well to the glass surface. The surface of this tacky film formed a quick set bond of substantial strength when pressed against glass, steel, painted metal, or paper.

To determine water extraction resistance of the product when baked, duplicate samples of the ethylene glycol monomethyl ether solution of the mixed polymers were transferred to 4-ounce bottles and given an initial drying period of one hour at 125° C. in a forced draft constant temperature oven. This treatment was followed by baking for 30 minutes at 150° C., whereupon the baked films were extracted with water equal to 200 times their individual weights. Agitation was provided by rolling for a 24-hour period. After separation from the water phase, the swollen samples were weighed, and then dried by

---

[1] Obtained from Union Carbide Corporation; designated as Y-1807 silicone resin.

heating at 150° C. for 50 minutes in a forced draft oven. Weights of the extracted, clear, redried films represent the unextractable portions of the original baked films. Results from the duplicate samples are as follows:

| Solution sample weight, grams | Calculated contained polymer, grams | Baked (150° C.) film weight, grams | Swollen sample weight, grams | Unextracted portion based on original calculated solids, percent |
|---|---|---|---|---|
| 12.1477 | 0.6626 | 0.7476 | 1.9425 | 81.9 |
| 14.5756 | 0.7950 | 0.8961 | 2.4781 | 86.0 |

That the original baked films were not merely an intimate mixture of the two components is indicated by the retention of substantial amounts of the poly(ethylene oxide) component by the films upon prolonged water extraction.

Example XXXVIII

Poly(ethylene oxide) was reacted with a carboxymethylcellulose[2], which in this experiment had on the average about 1.3 carboxymethyl groups per glucose residue. This corresponds to 0.55 carboxymethyl groups per 100 molecular weight. The poly(ethylene oxide) had a reduced viscosity in water at 30° C. of 4.63 at a concentration of 0.050 gram of polymer per 100 cc. of solution.

A 6.0 percent viscous solution of the poly(ethylene oxide) polymer was prepared by dissolving 180 grams of the resin in 2820 grams of water. A 2.0 percent solution of carboxymethyl cellulose (sodium salt) was prepared by adding 12.0 grams of the resin to 588 grams of rapidly agitated water in an Osterizer and stirring for 20 minutes. The pH of this solution was lowered from 7.25 to 1.01 by addition of 5 cc. of concentrated hydrochloric acid.

A combined solution of 267.0 grams and having a pH of 1.25 was obtained by thoroughly mixing 200 grams of the carboxymethyl cellulose solution with 67 grams of the poly(ethylene oxide) solution. Four grams of each polymer were present. A fairly flexible, strong and opaque product film weighing 0.9 gram was prepared by drying a portion of the solution on a glass slide overnight followed by drying in a vacuum oven at 1 mm. absolute pressure. Water absorption of 0.0740 gram or 18 percent occurred when a film sample of 0.4163 gram was mixed with 200 times its weight of water and rolled for 24 hours. Undissolved solids on a dry basis amounted to 0.2913 gram or 70.0 percent of the original sample weight as determined by drying the swollen sample to constant weight at 125° C. during a 20-hour period.

The remaining portion of the vacuum dried product was baked 60 minutes at 125° C. Water extraction of 0.4830 gram of this light tan colored material by the procedure just described resulted in 16.5 percent water absorption, and 85.4 percent insoluble.

An air-dried (for 48 hours) carboxymethyl cellulose film prepared from the acidified solution was white, opaque, and brittle. Water extraction of a 0.6502 gram sample of this material by the same procedure resulted in swelling of about 1400 percent, and 55.1 percent insoluble material. A similar sample which was first baked for 60 minutes at 125° C. also swelled about 1400 percent and was 63.2 percent insoluble.

Phase separation was observed in the original acidic solution of the two polymers upon standing overnight at room temperature. The upper phase was a clear, colorless, thin liquid which amounted to 20 to 25 percent of the total. The lower layer was a translucent gel. This lower gelatinous phase continually diminished in volume, and presumably densified, until at the end of a week it amounted to only about ⅓ of the total volume. The mixture was refrigerated during the last three days of this one-week period. The phases were separated and weighed, and their solids contents determined by drying samples to constant weight at 125° C. in a vacuum oven at 1 mm. absolute pressure during a period of about 20 hours. The upper phase weighing 136.31 grams had a solids content of 1.56 percent. The lower phase weighing 100.53 grams contained a solids concentration of 4.93 percent. These determinations indicate that 30 percent of the solids material in the two-phase system was present in the upper clear layer, and 70 percent was present in the lower gelatinous layer. Dried solids from the upper layer were weak and slightly waxy, while the dried product from the lower layer was tough, horny, and translucent.

Example XXXIX

Poly(ethylene oxide) was reacted with carboxymethyl dextran, the structural unit of which is approximated by the following formula:

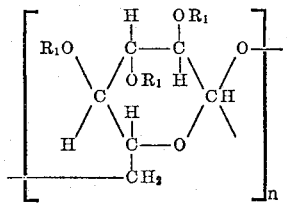

In the formula, $R_1$ represents hydrogen or the group —$CH_2COOH$ and $n$ is a whole number. In the sample used in this experiment the carboxymethyl groups per glucose residue approached 3 (theoretical maximum) which corresponds to 0.9 carboxymethyl groups per 100 molecular weight[3]. The viscosity of a 0.2 percent aqueous solution prepared by mild agitation was determined to be 8,500 centipoises using a Brookfield Viscometer Model RVF, Spindle No. 3 and speed of 10 r.p.m.

The poly(ethylene oxide) reactant had a reduced viscosity in water at 30° C. of 4.63 at a concentration of 0.050 gram of polymer per hundred cc. of solution. A 6.0 percent viscous solution of the poly(ethylene oxide) polymer was prepared by dissolving 180.0 grams of the resin in 2820 grams of water.

A 5.0 percent solution of carboxymethyl dextran was prepared by adding 30.0 grams of the resin to 570 grams of rapidly agitated water in an Osterizer and stirring for 20 minutes. The pH of this very thick solution was lowered from 4.0 to 1.50 by adding 5.0 cc. of concentrated hydrochloric acid and thoroughly mixing.

A combined solution of 275.0 grams having a pH of 2.0 was obtained by thoroughly mixing 150.0 grams of the 5.0 percent carboxymethyl dextran solution with 125.0 grams of the poly(ethylene oxide) solution. Each polymer was present in amounts of 7.50 grams. A white, opaque, wax-like product film of poor adhesion and weighing 0.80 gram was prepared by drying a portion of the solution on a glass slide overnight followed by drying at room temperature in a vacuum oven at 1 mm. absolute pressure. Water absorption of 0.2330 gram or 60 percent occured when a film sample of 0.3901 gram was mixed with 200 times its weight of water and rolled for 24 hours. Undissolved solids on a dry basis amounted to 0.2462 gram or 63.1 percent of the original sample weight as determined by drying the swollen sample to constant weight at 125° C. during a 20-hour period.

The remaining portion of the vacuum dried product film was baked 60 minutes at 125° C. to form a tan colored material, 0.4101 gram of which was extracted with water by the procedure just described. The insoluble portion was determined to be 0.3329 gram, or 81.2 percent.

An air-dried carboxymethyl dextran film prepared by drying 22.0 grams of the acidified solution was white, opaque, and brittle. Water extraction of this film (1.0660 grams) by the same procedure resulted in swelling of about 25.5 percent, and 9.8 percent insoluble material. A similar sample prepared from 22.477 grams of the solution and baked for 60 minutes at 125° C. swelled 104.5

[2] Obtained from Hercules Powder Company; designated as "CMC–120 High."

percent after 24 hours extraction by water, and was 57.7 percent insoluble. Details are summarized as follows:

| Sample | Sample weight, grams | | Water Absorption | | Insoluble Portion | |
|---|---|---|---|---|---|---|
| | Solution | Dry Solids | Grams | Percent by wt. | Grams | Percent by wt. |
| Poly(ethylene oxide)—CMD, air dried | | 0.3901 | 0.2330 | 60 | 0.2462 | 63.1 |
| Same, baked 60 min., 125° C | | 0.4101 | | | 0.3329 | 81.2 |
| CMD, air dried | 22.0 | 1.0660 | 0.2710 | 25.5 | 0.1048 | 9.8 |
| CMD, baked 60 min., 125° C | 22.5 | 1.0830 | 1.1320 | 104.5 | 0.6245 | 57.7 |

[3] Obtained from Midland Chemical Corporation. designated as DEMA-2316.

Phase separation was observed in the original acidic solution of the two polymers upon standing overnight at room temperature. The upper phase was a clear, colorless, thin liquid which amounted to about 5 percent of the total volume. The lower layer was a translucent gel. This lower gelatinous phase continually diminished in volume, and presumably densified, until at the end of a week, it amounted to about ½ of the total volume. The mixture was refrigerated during the last three days of this one-week period. The viscosity of the upper phase at 8° C. was 40 centipoises as determined by a Brookfield Viscometer at 2 r.p.m., and the viscosity of the lower phase was 6,300 centipoises under the same conditions. The phases were separated and weighed, and their solids contents determined by drying samples to constant weight at 125° C. in a vacuum oven at 1 mm. absolute pressure during a period of about 20 hours. The upper phase, weighing 111.33 grams, had a solids content of 3.74 percent, and the lower phase, weighing 138.91 grams, had a solids content of 6.70 percent. These determinations indicate that 30.3 percent of the solids material in the two phase system was present in the upper clear layer, and 69.7 percent was present in the lower gelatinous layer. White, resinous material was obtained from each phase upon air-drying samples for three days.

Example XL

Preparation of a pressure-sensitive adhesive composition from poly(vinyl ethyl ether) and acrylic acid-styrene copolymer is illustrated. The acrylic acid-styrene copolymer had been prepared from equal parts by weight of these two monomers, and had an acid number of 365 mg. of potassium hydroxide per gram of sample. This corresponds to 0.65 carboxyl groups per 100 molecular weight.

The poly(vinyl ethyl ether) to be reacted with the copolymer acid had a reduced viscosity in benzene at 20° C. of 3.6 at a concentration of 0.1 gram of polymer per 100 cc. of solution. Poly(vinyl ethyl ether) contains 1.4 ether groups per 100 molecular weight. The acrylic acid-styrene copolymer reduced viscosity was 5.9 by determination at 30.9° C. for a dimethylformamide solution containing 0.20 gram of sample per 100 cc. of solution.

A clear, viscous solution of the copolymer acid was prepared by dissolving 20.0 grams of this hard, granular solid in a mixture composed of 90.0 grams of toluene and 90.0 grams of ethylene glycol monomethyl ether. Solution was effected by rolling the mixture overnight, and the few small gels which remained were disintegrated by stirring for 2 minutes using high shear rates. Combining and mixing 50.0 grams of a 27.6 percent heptane solution of the poly(vinyl ethyl ether) with 31.25 grams of the toluene-ethylene glycol monomethyl ether copolymer solution gave a solution of the mixed polymers containing only a slight gelatinous precipitate which persisted after diligent stirring. The total mixture contained 18.5 percent acrylic acid-styrene copolymer and 81.5 percent poly(vinyl ethyl ether) on a solids basis. Casting of a wet film of 40 mils thickness from this solution on a glass slide and baking it for 30 minutes at 150° C. resulted in the formation of a clear, tacky film, which when pressed against paper, glass or steel surfaces produced a rather strong, quick-set bond.

A sample of the solution of mixed polymers weighing 6.5435 grams was transferred to a 4 oz. bottle and baked for 60 minutes at 150° C. in a forced draft, constant temperature oven. The resulting light yellow, clear film of 1.3820 grams (calculated dry-weight 1.3630 grams) was pressure-sensitive. The undissolved portion resulting from extraction of this pressure-sensitive film at room temperature for 24 hours with 100 grams of a mixed solvent containing 50 grams each of toluene and of ethylene glycol monomethyl ether amounted to 0.3040 gram after drying to constant weight during 4 hours at 125° C., which corresponds to 22.3 percent of the weight of the baked composition before extraction.

As indicated previously, association products provided by the instant invention have a variety of uses. In addition to being water-insoluble for extended periods of time, acid resistant, and alkali-soluble, these products are, in general, transparent, inherently flexible, and require no plasticizers, although plasticizers can be incorporated therein, if desired. Films made from association products exhibit good resistance to hydrocarbon and greases. Additionally, these films exhibit excellent adherence to glass, metal, cellulosic material, and the like. Moreover, the association products exhibit good resistance to abrasion. Also, as described previously, association products prepared from water-soluble or water-insoluble polymeric ether compounds and a water-insoluble polymeric carboxylic acid compound which contain an alpha, beta-ethylenically unsaturated carboxylic acid polymerized therein are highly useful as adhesive compositions. Textile cloth or fabric can be impregnated or coated with a film of association products which thus functions as a finishing agent. The textile cloth or fabric contemplated include, for example, synthetic and natural cloth, such as those prepared from cotton, wool, silk, acetate rayon, Orlon [4], nylon [5], Dacron [6], Dynel [7], etc., yarn, fiber, filament, and the like. The textile cloth can be immersed or coated with an aqueous solution containing the polyether and polyacid components, e.g., poly(ethylene oxide) and poly(acrylic acid), dissolved therein, the polyether component possessing an average molecular weight of at least about 4,000. Preferably, the polyether component contains, on the average, from about 0.5 to 2.85 etheric groups per 100 molecular weight and at least about 100 etheric groups whereas it is preferred that the polyacid component contains, on the average, from about 0.5 to 1.6 carboxylic acid groups per 100 molecular weight and at least about 100 carboxylic groups. The polymeric components can be maintained in aqueous solution by adjusting the pH of said solution above about 3.5 to prevent precipitation. Moreover, precipitation also can be prevented by incorporating into the solution one of the beforementioned inhibitors, for example, water-soluble amino compounds, ammonia, alkali metal hydroxide, alkali metal salts of weak acids, water-soluble ketones, monoalkyl ethers of alkylene glycols, and the like. The textile cloth thus immersed or coated with an aqueous solution containing the polymeric components

---

[4] E. I. du Pont de Nemours and Company trademark for a synthetic fiber made principally from polyacrylonitrile.
[5] Generic term for a series of polyamide resins made by the polymerization of (a) hexamethylenediamine salts of adipic acid.
[6] E. I. du Pont de Nemours and Company trademark for a synthetic fiber made by the condensation of dimethyl terephthalate and ethylene glycol.
[7] Union Carbide Corporation trademark for a synthetic fiber made by the copolymerization of acrylonitrile and vinyl chloride.

therein can be dried such as by air-drying under reduced pressure. If a water-soluble amino compound, ammonia, alkali metal hydroxide, or alkali metal salts of a weak acid was employed as the inhibitor, air-drying the resulting treated textile cloth generally results in the formation of a water-soluble coating thereon. However, by subjecting the treated textile cloth to elevated temperatures such as described previously will result in a water-insoluble coating on the cloth. Thus, textile cloths can be coated, impregnated, treated, or affixed with a water-soluble or water-insoluble composition in accordance with the teachings herein set forth. The association products of this invention are highly preferred and useful as finishing agents for textile cloth. In addition, cellulosic material such as paper, wood, cardboard, and the like can be impregnated, coated, treated or affixed with the association products of this invention in a manner similar to that explained previously in the discussion regarding textile cloth. The cellulosic material thus treated exhibits increased tear resistance, increased resistance to the detrimental effects of moisture and damp atmosphere, and is less susceptible to abrasion and deterioration due to constant or frequent handling or usage. From consideration of the previous discussion, it is evident that the association products of this invention are an exceedingly useful class of composition.

It is apparent that various modifications and ramifications of the subject invention can be made by those skilled in the art without departing from the scope and spirit thereof.

What is claimed is:

1. The product of chemical reaction of a polymeric polycarboxylic acid and a polymeric polyether; said acid contains at least an average of about 10 carboxylic acid groups, an averge molecular weight of at least about 600, and an average of from about 0.3 to about 1.7 free carboxylic acid groups per 100 molecular weight of said polymeric polycarboxylic acid, and said polymeric polyether has an average molecular weight of at least about 4000, possesses from about 0.5 to about 3.33 non-cyclic aliphatic ether groups per 100 molecular weight, and is from the groups consisting of poly(alkenyl alkyl ether) and a polyether possessing a plurality of recurring alkylene oxide radicals, the oxide moieties of which are said non-cyclic aliphatic ether groups, said product of chemical reaction being insoluble in hot and cold water.

2. A product of claim 1 wherein said polymeric polyether is a poly(alkylene oxide).

3. A product of claim 2 wherein said poly(alkylene oxide) is polyethylene oxide.

4. A product of chemical reaction from a polymeric polycarboxylic acid and a polymeric polyether in which said acid contains at least an average of about 10 carboxylic acid groups, an average molecular weight of at least about 600, and an average of from about 0.3 to 1.7 free carboxylic acid groups per 100 molecular weight of said polymeric polyacid, and said polymeric polyether has an average molecular weight of at least about 4000, possesses from 0.5 to 3.33 non-cyclic aliphatic ether groups per 100 molecular weight, contains at least an average of 100 non-cyclic aliphatic ether groups per molecule and comprises a plurality of recurring alkylene oxide radicals, the oxide moieties of the radicals being said non-cyclic aliphatic ether groups, said product of chemical reaction being insoluble in hot and cold water.

5. A pressure sensitive adhesive composition comprising the product of claim 1.

6. A pressure sensitive adhesive composition comprising the product of claim 4.

7. A fabric coated with the product of claim 1.

8. A pressure-sensitive adhesive of claim 5 wherein the polymeric carboxylic acid is a copolymer of styrene and acrylic acid and the polymeric polyether is a poly(vinyl alkyl ether) having an average molecular weight of at least about 4000, said product being insoluble in hot and cold water.

9. A pressure-sensive adhesive composition of claim 5 wherein the polymeric carboxylic acid is a copolymer of an aliphatic alpha, beta-ethylenically unsaturated carboxylic acid and an ethylenically unsaturated hydrocarbon and the polymeric polyether is a poly(alkenyl alkyl ether).

10. A process of making a water insoluble product of chemical reaction between a polymeric polycarboxylic acid and a polymeric polyether, which acid contains at least an average of about 10 carboxylic acid groups, an average molecular weight of at least about 600, and an average of from bout 0.3 to about 1.7 free carboxylic acid groups per 100 molecular weight of said polymeric polycarboxylic acid, and said polymeric polyether has an average molecular weight of at least about 4000, possesses from about 0.5 to about 3.33 non-cyclic aliphatic ether groups per 100 molecular weight, and is from the group consisting of poly(alkenyl alkyl ether) and a polyether possessing a plurality of recurring alkylene oxide radicals, the oxide moieties of which are said non-cyclic aliphatic ether groups, which comprises mixing said acid and said polyether in an aqueous medium having a pH of not greater than 3.5, precipitating said product and recovering said product from said medium.

11. The product of claim 2 wherein the polymeric carboxylic acid is polyacrylic acid.

12. The product of claim 2 wherein the polymeric polyether is a water-soluble poly(alkylene oxide).

13. The product of claim 4 wherein the polymeric polyether has a reduced viscosity of at least 1.0, measured from 0.2 gram of polyether per 100 milliliters of water at 30° C.

References Cited

UNITED STATES PATENTS

| | | | |
|---|---|---|---|
| 2,701,391 | 2/1955 | Yost | 260—41 |
| 2,765,228 | 10/1956 | Jordan | 260—851 |
| 2,838,421 | 6/1958 | Sohl | 260—837 |

FOREIGN PATENTS 487,056 6/1938 Great Britain.

SAMUEL H. BLECH, *Primary Examiner.*

MURRAY TILLMAN, *Examiner.*

P. LIEBERMAN, *Assistant Examiner.*